United States Patent [19]

Israelsen

[11] Patent Number: 5,255,090
[45] Date of Patent: Oct. 19, 1993

[54] PROGRESSIVE TRANSMISSION OF VECTOR QUANTIZED DATA
[75] Inventor: Paul D. Israelsen, North Logan, Utah
[73] Assignee: Scientific-Atlanta, Inc., Atlanta, Ga.
[21] Appl. No.: 794,493
[22] Filed: Nov. 19, 1991
[51] Int. Cl.⁵ ............... H04N 7/13; H04N 7/133; H04N 7/137
[52] U.S. Cl. ................ 358/133; 341/67; 358/86; 358/135; 358/136
[58] Field of Search ........... 358/86, 133, 135, 136, 358/138, 105; 341/67

[56] References Cited

U.S. PATENT DOCUMENTS

| | | | |
|---|---|---|---|
| 4,560,977 | 12/1985 | Murakami et al. | 341/118 |
| 4,588,350 | 12/1985 | Murakami et al. | 358/21 |
| 4,849,810 | 7/1989 | Ericsson | 358/133 |
| 4,878,230 | 10/1989 | Murakami | 358/136 |
| 4,878,230 | 10/1989 | Murakami et al. | 375/27 |
| 4,933,761 | 6/1990 | Murakami | 358/133 |
| 4,951,139 | 8/1990 | Hamilton et al. | 358/13 |
| 4,954,892 | 9/1990 | Asai et al. | 358/133 |
| 4,979,039 | 12/1990 | Kisor et al. | 358/133 |
| 5,010,401 | 4/1991 | Murakami et al. | 358/136 |
| 5,021,971 | 6/1991 | Lindsay | 395/2 |
| 5,031,037 | 7/1991 | Israelsen | 358/136 |
| 5,067,152 | 11/1991 | Kisor et al. | 380/10 |
| 5,068,723 | 11/1991 | Dixit et al. | 358/133 |
| 5,086,439 | 2/1992 | Asai | 358/133 |
| 5,122,873 | 6/1992 | Golin | 358/133 |
| 5,130,797 | 7/1992 | Murakami et al. | 358/133 |

OTHER PUBLICATIONS

"Vector Quantization of Digital Images", Baker, Richard L., Stanford University–University Microfilms International, *UMI Dissertation Information Service*, (Copyright, 1984).
"Vector Quantization", Gray, Robert M., The Institute of Electrical and *Electronics Engineers, Inc.*, ASSP Mag., vol. 1, pp. 4-29, Apr., 1984.
"Variable Rate Vector Quantization of Images", Riskin, Eve A., Dissertation submitted to the Dept. of Electrical Engineering–Stanford University, May, 1990.
U.S. patent application Ser. No. 395,496 entitled "Frame-to-Frame Compression of Vector Quantized Signals and Other Pos-Processing", Filed: May 31, 1989.
"Variable-Rate Multi-Stage Vector Quantization For Image Coding", Ho, Yo-Sung and Gersho, A., Dept. of Electrical and Computer Eng., University of Calif., pp. 1156–1159.
"Pruned Tree-Structured Vector Quantization in Image Coding", Riskin, Eve A., et al., *Information Systems Lab.*, Stanford University–Stanford, Calif.
"Image Compression Methods With Distortion Controlled Capabilities", Markas, T. et al., Depts of *Elec. Eng. and Computer Science*, Duke University, Durham NC.
"Variable Rate Vector Quantization for Medical Image Compression", Riskin, Eve A., Lookabaugh, T., et al., *IEEE Trans. on Medical Imaging*, vol. 9, No. 3, Sep. 1990.
"Progressive Image Transmission: A Review and Comparison of Techniques", Tzou, Kou-Hu, *Optical Engineering*, vol. 26, No. 7, Jul. (1987).
"Image Compression Using Adaptive Vector Quantization", Goldberg, M., et al., IEEE Trans. Commun. vol. COM-34, pp. 180–187, Feb. 1986.

*Primary Examiner*—Howard W. Britton
*Attorney, Agent, or Firm*—Woodcock, Washburn, Kurtz, Mackiewicz & Norris

[57] ABSTRACT

A distortion adaptive vector quantization method is employed to select, for each input vector, several codevectors from a tree structured codebook. The first codevector defines a basis signal, and each subsequent codevector defines an enchancement signal. The basic signal is indicative of the full codebook address from which the first codevector was selected. Each enhancement signal is indicative of only so much of the additional address bits that are required, in combination with the basic signal, to identify the address of the codebook from which the subsequent codevectors were selected. The basic signal and each enhancement signal are transmitted to a decoder which may employ only the basic signal, or the basic signal and one or more of the enhancement signals to reproduce the input vector. The reproduction quality of the input vector increases with the number of enhancement signals chosen.

37 Claims, 13 Drawing Sheets

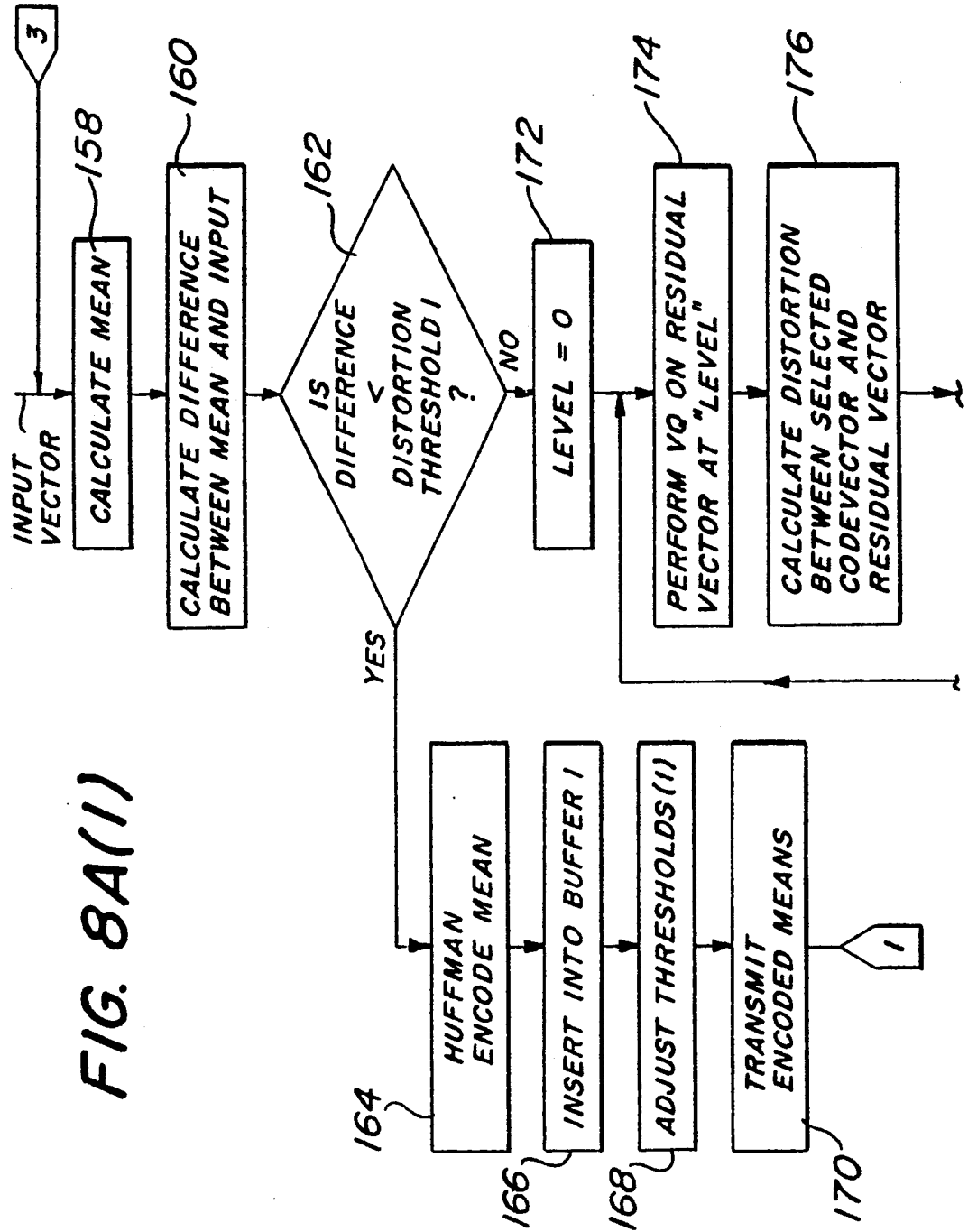
FIG. 8A(1)

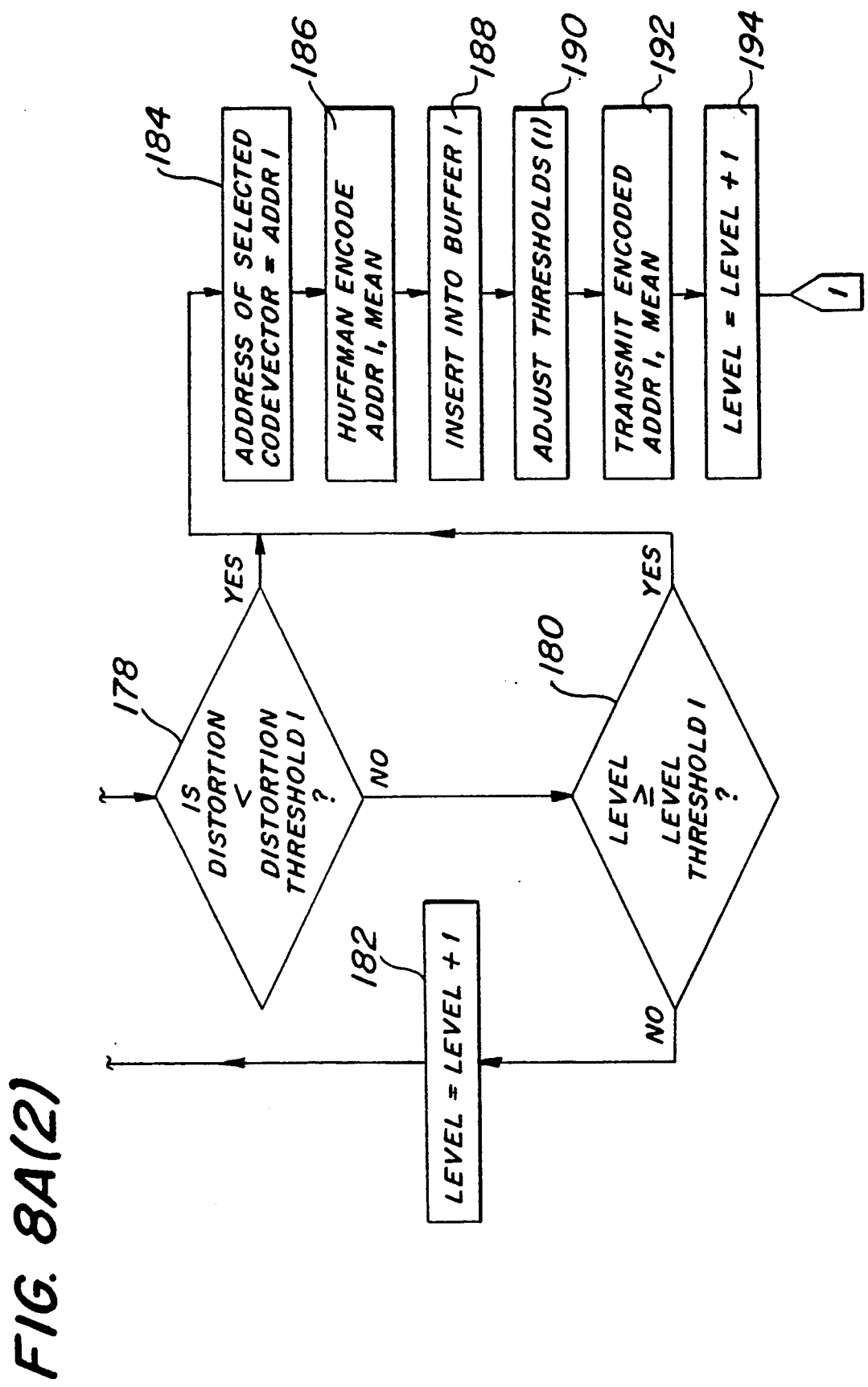
FIG. 8A(2)

PROGRESSIVE TRANSMISSION OF VECTOR QUANTIZED DATA

RELATED APPLICATION DATA

The subject matter of this application is related to the subject matter of the following co-pending patent applications:

Ser. No. 794,516, entitled "Image Compression Method and Apparatus Employing Distortion Adaptive Tree Search Vector Quantization";

Ser. No. 794,589, entitled "Image Compression Method and Apparatus Employing Distortion Adaptive Tree Search Vector Quantization With Avoidance of Transmission of Redundant Image Vector Data";

Ser. No. 794,585, entitled "Method For Selecting Reproduction Quality of Transmitted Vector Quantized Data"; and, Ser. No. 794,491, entitled "Method and Apparatus for Transforming Between Fixed Rate Vector Quantized Data and Variable Rate Vector Quantized Data".

FIELD OF THE INVENTION

The present invention relates generally to a data compression method and apparatus. More particularly, the present invention relates to a method and apparatus for compressing image data by an adaptive tree search vector quantization technique and for progressively transmitting the same.

BACKGROUND OF THE INVENTION

The background of the present invention is described herein in the context of pay television systems, such as cable television systems or direct broadcast satellite (DBS) systems, that distribute program material to subscribers, but the invention is by no means limited thereto except as expressly set forth in the accompanying claims.

In a typical cable television system, cable television operators receive much of their program material from remote earth station transmitters via a plurality of geosynchronous orbit satellites. The cable operator selects the program material to be made available to its subscribers by making arrangements with the satellite distributors of that program material. The cable operator receives the transmitted program material at its "cable head-end," where it then re-transmits the data to individual subscribers. Frequently, cable operators also provide their own local programming at the site of the head-end, and further include network broadcasts as well.

In a DBS system, individual subscribers are provided with their own satellite receiver. Each subscriber establishes a down-link with the broadcasting satellite directly. Thus, there is no need, as with cable systems, for re-transmission from a cable head-end.

Typically, in both types of systems (cable and DBS), the program material (both video and audio) is originally in analog form. Conventional transmission techniques place substantial limitations on the maximum number of viewer channels that can be transmitted over any given transponder on a satellite, since each channel requires a minimum bandwidth to avoid noticeable degradation and the total number of channels that can be transmitted over a given satellite transponder is limited by the bandwidth of the satellite transponders. In cable systems, the electrical properties of the coaxial cable and associated amplifiers limit its bandwidth and therefore phase substantial limitations on the number of channels that can be delivered to cable television subscribers using conventional transmission techniques.

As a result of the desire to provide more program channels and/or HDTV (high definition television) to viewers over existing broadcast bandwidths, the industry (most noticably, the cable television industry) has begun to investigate digital image transmission techniques. Although the desire is to minimize the transmission bandwidth of program material, thus allowing more channels to be transmitted over an existing broadcast bandwidth, digital image transmission further offers the advantage that digital data can be processed at both the transmission and reception ends to improve picture quality. Unfortunately, the process of converting the program material from analog form to digital form results in data expansion which increases the transmission bandwidth of the program material rather than decreasing it. Therefore, digital transmission alone does not solve the bandwidth problem, but instead makes it worse. However, through the application of digital data compression techniques, large bandwidth reductions can be achieved.

Data compression techniques minimize the quantity of data required to represent each image. Thus, more program material, or more channels, can be offered over an existing broadcast bandwidth. However, any data compression achieved is offset by the data expansion which occurs during the analog to digital conversion. Therefore, to be practical, the compression technique employed must achieve a compression ratio large enough to provide a net data compression. Digital data compression techniques, such as Huffman encoding and LZW (Lempel, Ziv and Welch) encoding, offer, at best, compression ratios of 2.5 to 1 and do not compensate sufficiently for the data expansion that occurs in converting data from analog to digital form.

In response to the need for large compression ratios, a number of so-called "lossy" compression techniques have been investigated for digital image compression. Unlike the Huffman and LZW encoding techniques, these "lossy" compression techniques do not provide exact reproduction of the data upon decompression. Thus, some degree of information is lost; hence the label "lossy." One such "lossy" compression technique is called DCT (discrete cosine transform) data compression. Another method, which, until recently, has been used principally for speech compression, is vector quantization. Vector quantization has shown promise in image compression applications by offering high image compression rates, while also achieving high fidelity image reproduction at the receiving end. It has been demonstrated, for example, that using vector quantization (hereinafter sometimes referred to as "VQ"), compression ratios as high as 25:1, and even as high as 50:1, can be realized without significant visually perceptible degradation in image reproduction.

Compression of video images by vector quantization initially involves dividing the pixels of each image frame into smaller blocks of pixels, or sub-images, and defining a "vector" from relevant data (such as intensity and/or color) reported by each pixel in the subimage. The vector (sometimes called an "image vector") is really nothing more than a matrix of values (intensity and/or color) reported by each pixel in the sub-image. For example, a black and white image of a house might be defined by a 600×600 pixel image, and a 6×4 rectangular patch of pixels, representing, for example, a shadow, or part of a roof line against a light background, might form the sub-image from which the vector is constructed. The vector itself might be defined by a plurality of gray scale values representing the intensity reported by each pixel. While a black and white image serves as an example here, vectors might also be formed from red, green, or blue levels of a color image, or from the Y, I and Q components of a color image, or from transform coefficients of an image signal.

Numerous methods exist for manipulating the block, or sub-image, to form a vector. R. M. Gray, "Vector Quantization", *IEEE ASSP Mag.*, pp. 4–29 (April, 1984), describes formation of vectors for monochrome images. E. B. Hilbert, "Cluster Compression Algorithm: A Joint Clustering/Data Compression Concept", Jet Propulsion Laboratory, Pasadena, Calif., Publ. 77–43, describes formation of vectors from the color components of pixels. A. Gersho and B. Ramamurthi, "Image Coding Using Vector Quantization", *Proc. IEEE Int. Conf. Acoust., Speech, Signal Processing*, pp. 428–431 (May, 1982), describes vector formation from the intensity values of spatially contiguous groups of pixels. All of the foregoing references are incorporated herein by reference.

By way of example, a television camera might generate an analog video signal in a raster scan format having 600 scan lines per frame. An analog to digital converter could then digitize the video signal at a sampling rate of 600 samples per scan line, each sample being a pixel. Digital signal processing equipment could then store the digital samples in a 600×600 pixel matrix. The 600×600 pixel matrix could then be organized into smaller blocks, for example 6×4 pixel blocks, and then each block could be converted into an image vector. Each of these image vectors would then be compressed as described below.

In an image vector quantizer, a vector quantization "codebook" is created from training data comprising a representative sample of images which the quantizer is likely to encounter during use. The codebook consists of a memory containing a set of stored "codevectors," each representative of commonly encountered image vectors. For example, one codevector might be a 6×4 pixel solid black patch. Another codevector might have all white pixels in the top three rows, and all black pixels in the bottom three rows. Yet another codevector might have a gradient made up of white pixels in the top row, black pixels in the bottom row, and four rows of pixels in between having shades of gray from light to dark. Typically, a codebook of representative codevectors is generated using an iterative clustering algorithm, such as described in S. P. Lloyd, "Least Squares Optimization in PCM", *Bell Lab. Tech. Note*, (1957) (also found in IEEE Trans. Inform. Theory, Vol. IT-28, pp. 129–137, March (1982); and, J. T. Tou and R. C. Gonzalez, "Pattern Recognition Principles", pp. 94–109, Addison-Wesley, Reading, Mass. (1974). Both of these references are incorporated herein by reference. See also, Y. Linde, A. Buzo and R. Gray, "An Algorithm For Vector Quantizer Design", *IEEE Transactions on Communications*, Vol. COM-28, No. 1 (January 1980), incorporated herein by reference.

Each codevector in the codebook is assigned a unique identification code, sometimes called a label. In practice, the identification codes, or labels, are the memory addresses of the codevectors. For each input image vector, data compression is achieved by selecting the codevector in the codebook that most closely matches the input image vector, and then transmitting the codebook address of the selected codevector rather than the input image vector itself. Compression results because generally, the addresses of the selected codevectors are much smaller than the image vectors.

By way of example, the codevector having the solid black patch described above, might be assigned address #1. The codevector having the white pixels in the top half and black pixels in the bottom half might be assigned address #2, and so on for hundreds or thousands of codevectors. When quantizing a full image, a vector quantizer divides the full image frame into a series of image vectors. For each image vector, the vector quantizer identifies one closely matching codevector. The vector quantizer then generates a new signal made up of the series of labels, or memory addresses where the codevectors were found. For the example of a full image of a house, the vector quantizer would divide the full image into numerous image vectors. The quantizer might then replace image vectors from shadowed areas with address #1 (the solid black patch), and it might replace the roof line image vectors with address #2 (white in the top half and black in the bottom half). As mentioned above, compression results because, typically, the length of the labels or addresses is much smaller than the size of the codevectors stored in memory. Typically, the addresses are transmitted by any conventional technique so that the image can be reconstructed at the receiver.

Reconstruction of the original full image at the receiver (or at least a very close approximation of the original image) may be accomplished by a device which has a codebook, identical to the codebook at the transmitter end, stored in a memory. The device that performs vector quantization and compression at the transmitter is called an encoder, and the device that performs decompression and image reproduction at the receiving end is called a decoder. The decoder reconstructs (at least an approximation of) the original image by retrieving from the codebook in the decoder the codevectors stored at each received address. Generally, the reconstructed image differs somewhat from the original image because codevectors do not usually precisely match the image vectors. The difference is called "distortion." Increasing the size of the codebook generally decreases the distortion.

Many different techniques for searching a codebook to find the codevector that best matches the image vector have been proposed, but generally the methods can be classified as either a full search technique, or a branching (or tree) search technique. In a full search technique, the vector quantizer sequentially compares an input image vector to each and every codevector in the codebook. The vector quantizer computes a measure of distortion for each codevector and selects the one having the smallest distortion. The full search technique ensures selection of the best match, but involves the maximum number of computational steps. Thus, while distortion can be minimized using a full search technique, it is computationally expensive. The aforementioned article by Y. Linde, A. Buzo and R. Gray entitled "An Algorithm For Vector Quantizer Design" describes the full search technique and the computational steps involved in such a search. The full search technique is sometimes called "full search vector quantization" or "full search VQ".

The tree search technique reduces the number of codevectors that must be evaluated (and thus reduces search time), but does not necessarily identify the very best match. Consequently, to maintain a given level of distortion, the tree search technique requires a larger codebook than the full search technique. The tree search technique can be considered as one that searches a sequence of small codebooks, instead of one large codebook. The codebook structure can be depicted as a tree, and each search and decision corresponds to advancing along a branch to the next level or stage in the tree, starting from the root of the tree. Thus, only the codevectors along certain branches of the tree are searched, thereby reducing the search time. A detailed description of the tree search technique may be found in R. M. Gray and H. Abut, "Full Search and Tree Searched Vector Quantization of Speech Waveforms," *Proc. IEEE Int. Conf. Acoust., Speech, Signal Processing*, pp. 593-96 (May 1982), and R. M. Gray and Y. Linde, "Vector Quantization and Predictive Quantizers For Gauss Markov Sources", *IEEE Trans. Comm.*, Vol. COM-30, pp. 381-389 (February 1982), both of which are incorporated herein by reference. The tree search technique is sometimes referred to as "tree-search vector quantization", "tree-search VQ" and "TSVQ." Notwithstanding the larger memory that is required to maintain a given level of distortion, this technique has found favor for compressing dynamic images, since it is computationally faster.

The process of vector quantizing data can be either "fixed rate" or "variable rate." Fixed rate VQ occurs when all of the transmitted address data has the same length. Generally speaking, variable rate VQ offers the advantage that the average rate at which VQ data is transmitted is less than the rate that would be experienced if fixed rate VQ were employed for the same image at the same distortion level. In the context of pay television systems, this advantage can be significant, since it can represent a much greater increase in the number of channels that can be carried over existing media (such as satellite and cable) than would be realized if fixed rate VQ were employed.

Several techniques are available for implementing variable rate VQ. In one technique, the quantity of compressed data generated by an image depends on the image content. For example, a variable rate VQ system might employ two different vector sizes. A large vector size might be used to describe simple parts of the image, and a small vector size might be used to describe complex parts of the image. The amount of compressed data generated depends on the complexity of the image. Sung Ho and A. Gersho, "Variable Rate Multi-Stage Vector Quantization For Image Coding", University of California, Santa Barbara (1988) (Available as IEEE Publ. No. CH 2561-9 88 00001156) teach one such technique. This reference is incorporated herein by reference. A disadvantage of this type of variable rate VQ is that the decoder is always more complex than a fixed rate decoder since the decoder requires a video buffer store to reconstruct the image, whereas a fixed rate decoder does not.

Another variable rate VQ scheme is described in E. A. Riskin, "Variable Rate Vector Quantization of Images", Ph. D. Dissertation—Stanford University, pp. 51 et seq. (May, 1990), incorporated herein by reference. Riskin employs an "unbalanced" tree structured codebook. An "unbalanced" tree structure is simply an incomplete tree; in other words, some branches of the tree may extend to further levels of the tree than other branches. As is common in tree search VQ, Riskin's codebook is searched by advancing from level to level along selected branches. Encoding will occur at different levels of the tree, thereby achieving variable rate transmission since the address length is a direct function of the level from which a codevector is selected. One disadvantage of this method is that it is not distortion adaptive and variable rate VQ occurs, in part, as a result of the unbalanced nature of the tree.

A better implementation of variable rate VQ is disclosed in co-pending U.S. application Ser. No. 794,516 entitled "Image Compression Method and Apparatus Employing Distortion Adaptive Tree Search Vector Quantization," which is incorporated herein by reference. According to this application, codevectors are selected from varying levels of a tree structured codebook according to an adjustable threshold. One advantage of this implementation is that the threshold can be adjusted to alter the level of the tree at which encoding occurs, which in turn alters the average length of the addresses. Thus, this implementation is distortion adaptive.

The Riskin method permits transmission of increasingly accurate reproductions of input image data upon request by a recipient of the vector quantized image data. According to the Riskin method, each input vector of an image is first encoded at an initial level of the tree. The addresses of the codevectors selected for each input vector (from the initial level) are then transmitted. The encoder remembers the level at which each input vector was initially encoded. If the recipient requests greater accuracy, this is communicated to the encoder, and the encoder encodes each input vector at a next level of the tree, and the addresses of the codevectors selected from this level are transmitted. This process is repeated until either the recipient has received a satisfactory reproduction of the input image or until the encoder reaches the bottom level of the tree.

A disadvantage of Riskin's "progressive transmission" method is that the enhanced (i.e., more accurate) data is only transmitted when requested by the recipient. Moreover, Riskin's "progressive transmission" scheme is not adaptive in any sense of the word.

It is desirable to provide a progressive transmission method wherein image data recipients may choose the reproduction quality of transmitted image data without having to communicate with the encoder to select the quality level. Furthermore, it is desirable to provide such a progressive transmission technique that is adaptive and accounts for changes in image complexity so that, on average, the rate of transmission VQ datawords is substantially constant. The present invention achieves these goals.

SUMMARY OF THE INVENTION

The present invention is for particular use in connection with a tree search, variable rate vector quantization data compression system. As is common, the compression system organizes an image frame into blocks of input data and converts each block of input data to a multi-dimensional input vector. The compression system also has a codebook with plural levels of codevectors, with each codevector being representative of a possible input vector. The codevectors at each successive level represent possible input vectors with generally greater accuracy than codevectors at a preceding level. Each codevector has an associated address, and, by virtue of the tree structure of the codebook, the addresses have variable length wherein addresses associated with successive levels of the codebook have greater length than addresses associated with preceding levels of the codebook.

According to the invention, a method for progressively transmitting address data comprises automatically selecting a plurality of codevectors for each input vector, wherein each codevector is selected from a different level of the codebook. Then, for a first one of the selected codevectors, data indicative of the address associated therewith is transmitted. Following that, for each of the other selected codevectors, data indicative of at least a portion of the address of each other selected codevector is transmitted. The data transmitted for each of the other selected codevectors, i.e., the portions of the addresses, when combined with previously transmitted data, uniquely identifies each other selected codevector.

According to one preferred embodiment of the invention, the plurality of codevectors are selected according to a plurality of different threshold values. In particular, there is preferably a plurality of first and second threshold values, wherein each first threshold value is indicative of a tolerable distortion between a representation of the input vector and a codebook vector, and each second threshold value is indicative of a level of the codebook from which a codevector should be selected if the distortion is greater than the first threshold value.

According to a most preferred embodiment of the invention, codevectors are selected according to the following technique:

(i) selecting an initial level of the codebook and a first one of each of first and second threshold values;

(ii) initially selecting the codevector at the selected level that most closely resembles a representation of the input vector;

(iii) obtaining a measure of difference between the initially selected codevector in step (ii) and the selected one of the first threshold values;

(iv) defining the initially selected codevector in step (ii) as a finally selected codevector if either (a) the measure of difference is not greater than the selected one of the first threshold values or (b) the selected level is not less than the selected one of the second threshold values, then transmitting data indicative of the address of the finally selected codevector and proceeding to step (vi), but otherwise proceeding to step (v);

(v) selecting subsequent levels in the codebook and repeating steps (ii)-(iv) for each subsequent level until address data has been transmitted;

(vi) selecting next subsequent codebook levels and subsequent ones of each of the first and second threshold values; and, (vii) repeating steps (ii)-(vi) so as to transmit address data for finally selected codevectors from plural levels of the codebook.

According to a further embodiment of the invention, there are a plurality of buffers for temporary storage of the address data to be transmitted. The address data for the first one of the selected codevectors is stored in a first one of the buffers. The portions of the address data corresponding to each of the other selected codevectors are stored in associated ones of the other buffers. Each buffer corresponds to one of the threshold values, and each threshold value is periodically and individually adjusted based upon the measure of unused capacity of its corresponding buffer. Address data is transmitted from each buffer at a fixed data rate. Adjustment of the threshold values ensures that none of the buffers overflows or empties as a result of storing variable length address data while transmitting the same at a fixed data rate.

In another embodiment of the invention, the threshold value may be calculated (or found by trial and error) such that the amount of compressed data generated by a predetermined number of images is constant. For example, the threshold value can be set for each image so that it generates a fixed quantity of compressed data.

A data compression apparatus according to the present invention comprises first means for receiving a multi-dimensional input vector representative of a block of data to be compressed. There is also provided a tree search vector quantization codebook having plural levels of codevectors, with each codevector being representative of a possible input vector. The codevectors at each successive level represent possible input vectors in greater detail than codevectors at a preceding level, and each codevector has a unique address associated therewith.

A controller is coupled to the first means and to the tree search codebook for maintaining a plurality of threshold of values and for repeatedly and automatically comparing the input vector to the codevectors at successive levels of the codebook. The controller also repeatedly and automatically selects a plurality of codevectors for the input vector. Each codevector is selected from a different level of the codebook based upon a comparison of one of the threshold values with a measure of difference between the codevector and the input vector.

There is also provided a plurality of transmitters, each coupled to the controller. A first one of the transmitters transmits an indication of the address associated with a first one of the selected codevectors. This indication defines a basic signal. Each other transmitter transmits an indication of at least a portion of the address associated with one of the remaining selected codevectors. These indications define enhancement signals.

A decoder for use by subscribers comprises a second codebook that is substantially identical in content to the codebook in the data compression apparatus. The decoder also comprises means for receiving the basic signal and each enhancement signal, and for combining the basic signal and a selected number of enhancement signals to obtain an address for addressing the second codebook. The decoder employs the obtained address to retrieve a codevector from its codebook. The retrieved codevector is a function of the number of enhancement signals combined with the basic signal. The decoder also comprises means for converting the retrieved codevectors to NTSC image data and for providing the NTSC image data at an output thereof for substantially reproducing images input to the data compression apparatus.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings, an embodiment that is preferred, it being understood, however, that the invention is not limited to the specific methods and instrumentalities disclosed. In the drawings.

DETAILED DESCRIPTION OF THE PREFERRED EMBODIMENT

Before proceeding to the description of the drawings, it should be understood that, although the invention is described herein in the context of broadcasting television signals, such as movies and the like, in a pay television system, the present invention is in no way limited thereto. Rather, the present invention may be employed wherever it is desired to compress and transmit any type of data, including image data, voice data, etc. The terms "pay television" and "pay television subscriber" are used in the instant specification and accompanying claims to encompass both cable television and direct broadcast satellite applications. However, the invention is by no means limited to pay television systems, but has application to conventional (i.e., free) television transmission and reception.

Figure 1:
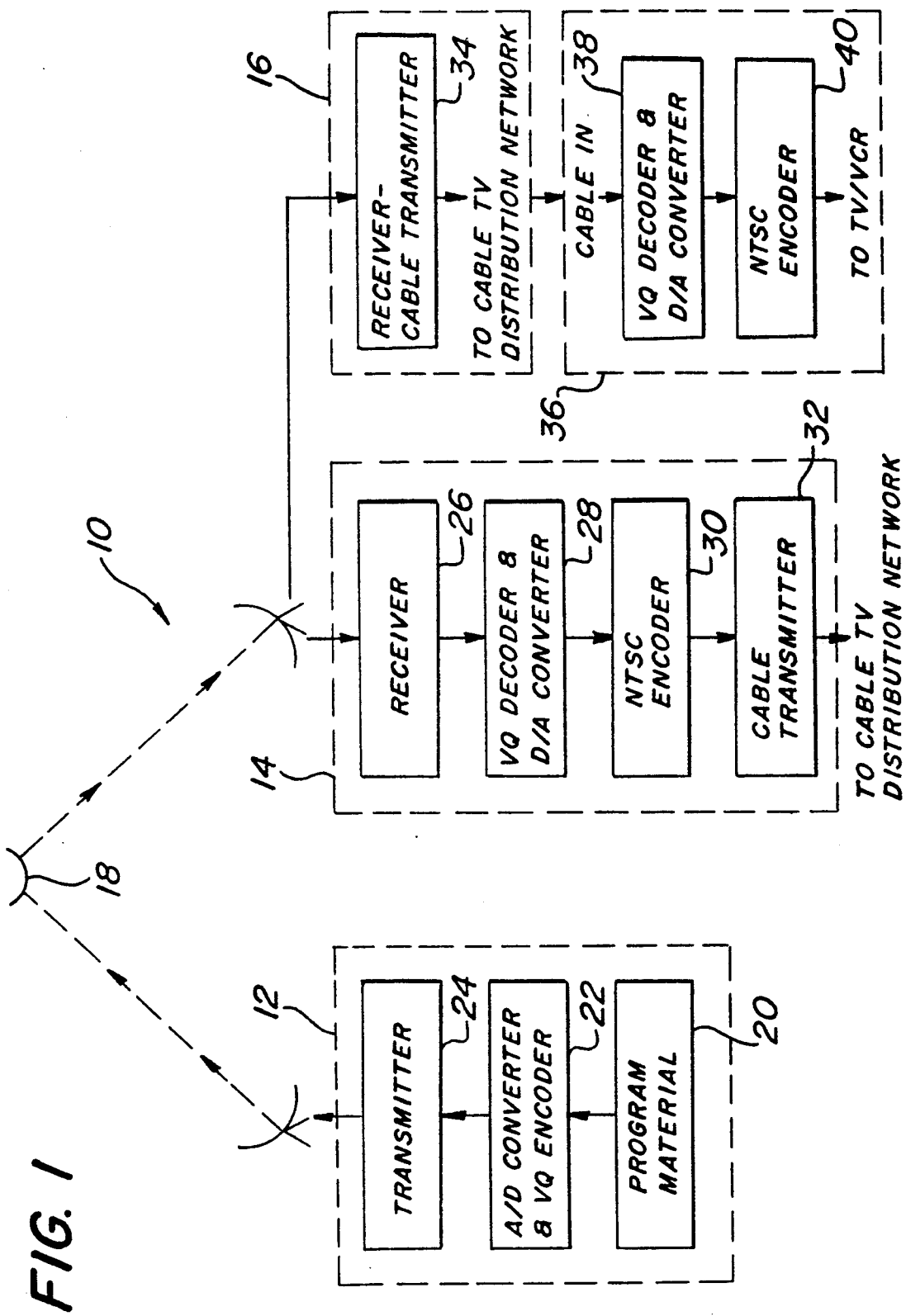
FIG. 1 is a block diagram illustrating an application of the present invention to a pay television system employing satellite communication to transmit program material.

Referring now to the drawings, wherein like numerals indicate like elements, there is illustrated in FIG. 1 an exemplary application of a vector quantization image compression system according to the present invention wherein moving image data (e.g., television signals, such as movies, etc.) is communicated from a transmitter location of pay television signals 12 to receiving locations such as 14 or 16. Typically, the transmitter location 12 might include a source 20 of program material that supplies movies, and the like in analog form to an apparatus (encoder) 22 for digitization and data compression by vector quantization. Details of apparatus 22 will be supplied hereinafter.

Compressed, digitized data is transmitted to a satellite 18, via transmitter 24, for reception by a plurality of receiving locations (earth stations) such as 14 or 16. The receiving locations may be the head-end (or other reception site) of a cable television distribution system (e.g., location 14 or 16) of the type which receives signals from the satellite 18 and distributes them to a plurality of subscribers via coaxial cable. Alternatively, as will be explained in connection with FIG. 2, one or more of the receiving locations may be a DBS (direct broadcast satellite) subscriber who receives signals directly from the satellite 18.

Returning now to the cable television application of FIG. 1, there is shown two types of cable head-end installations 14, 16 that may receive the down-link from the satellite 18. The cable head-end installation 14 may employ the received data in a different manner than the cable head end installation 16, however, the end result (availability of image data for display or recording) is the same to the cable television subscribers of each system. The two examples of cable head-end installations 14, 16 are shown to demonstrate the versatility of the present invention.

The cable head-end installation 14 may receive the data transmitted by the station 12 via the receiver 26, then employ an on-site apparatus (decoder) 28 for decompressing the received data and converting the same back to analog form. Details of apparatus 28 will be supplied hereinafter. Another on-site apparatus 30 may convert the analog data to conventional NTSC signals for transmission over the cable to subscribers via a transmitter 32. Thus, in the case of cable head-end installation 14, the cable head-end operator distributes analog NTSC cable television signals to subscribers in conventional form.

In the case of the cable head end installation 16, the data transmitted by station 12 may be received via a receiver/transmitter 34 that conditions the received data for transmission over the cable system to cable television subscribers. That is, the operator of the cable head end system 16 does not decode or decompress the received data, nor does it convert the same to analog form. Rather, the operator of the cable head-end system 16 simply transmits the compressed image data over the cable system for receipt by the subscribers. Subscribers of the system 16 must therefore be provided with VQ decoder boxes 36 (described hereinafter), whereas subscribers to the system 14 may employ conventional set-top decoders. Alternatively, the decoder may be placed somewhere in the cable distribution system. The VQ decoder boxes 36, in general, comprise a VQ decoder 38 for decompressing received data and converting the same to analog form and an apparatus 40 for converting the analog data to NTSC format for display on a TV or recording on a VCR. The apparatus 38 of the system 16 may be identical to the apparatus 28 of the system 14. The decoder box 36 may be embodied as a set-top decoder, or may be built into a television set or VCR. Alternatively, the decoder may be placed elsewhere in the cable distribution system.

While subscribers to the system 16 must use the above-described decoder box 36, an advantage of the system 16 is that, due to the highly compressed nature of the image data sent over the cable distribution network by the cable operator, many more channels may be transmitted over the cable to subscribers as may be transmitted over the cable in the system 14. Alternatively, the system 16 enables transmission of HDTV signals without sacrificing other channel space.

Figure 2:
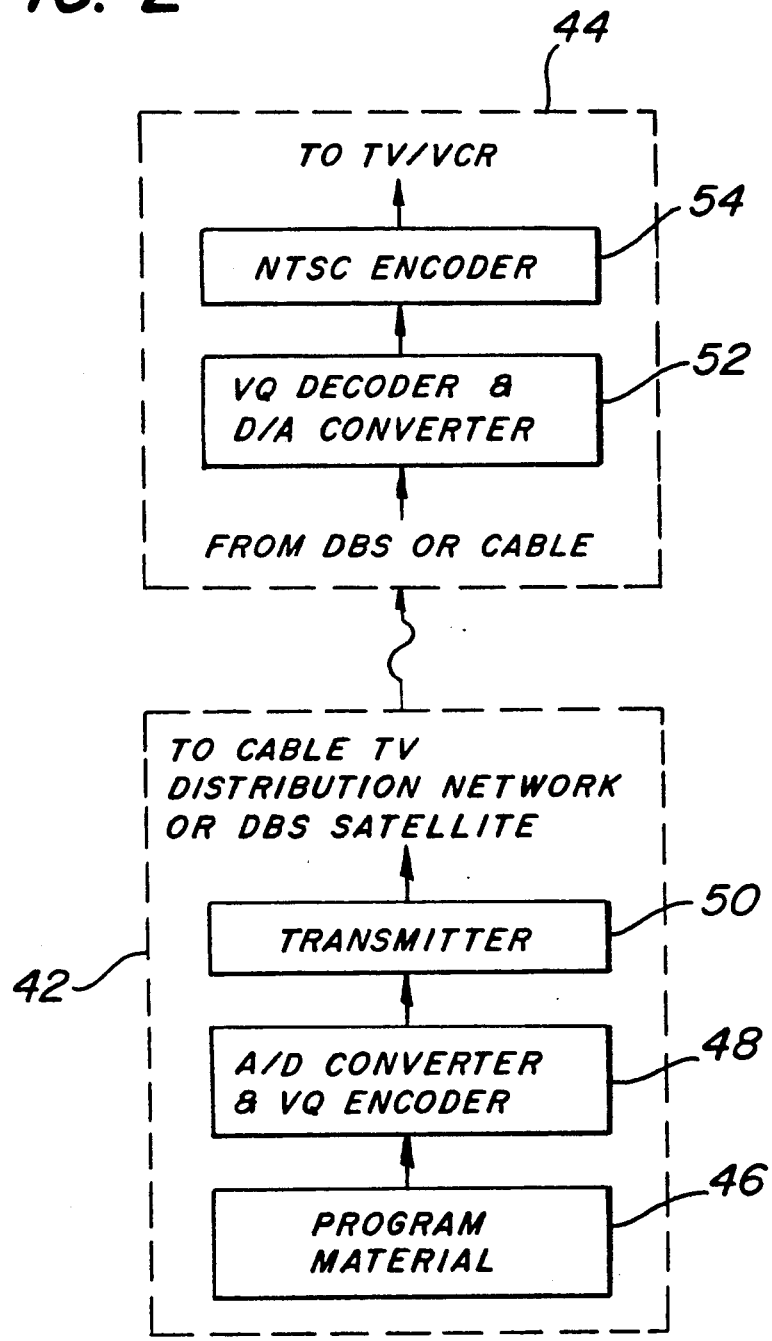
FIG. 2 is a block diagram illustrating another application of the invention to a pay television system employing cable or direct broadcast satellite for transmitting program material.

FIG. 2 illustrates another application of the present invention, also to a pay television system. In the system of FIG. 2, block 42 represents a cable or DBS head-end. The operator of the head end 42 may insert program material 46 (such as network television stations, video tapes, etc.) directly at the locale of the head-end for transmission (via either cable or DBS) to the subscribers. Thus, as shown in FIG. 2, the head-end 42 may include an apparatus (encoder) 48 for digitizing and compressing the locally provided program material 46, and a transmitter 50 for transmitting data from encoder 48 (again, via either cable or satellite) to each of the subscribers. The encoder 48 of FIG. 2 may be identical to the encoder 22 of FIG. 1.

Each subscriber to the system of FIG. 2 may be equipped with a decoder box 44 (that may be identical to the decoder box 36 of FIG. 1) that comprises an apparatus (decoder) 52 for decompressing received data and converting the same to analog form. The decoder box 44 may also be provided with an apparatus 54 for placing the analog data into NTSC format for display on a television set or for recording via a VCR. As in the case of decoder box 36, the decoder box 44 may be embodied as either a set-top decoder box, or may be built into a television set or VCR.

Figure 3:
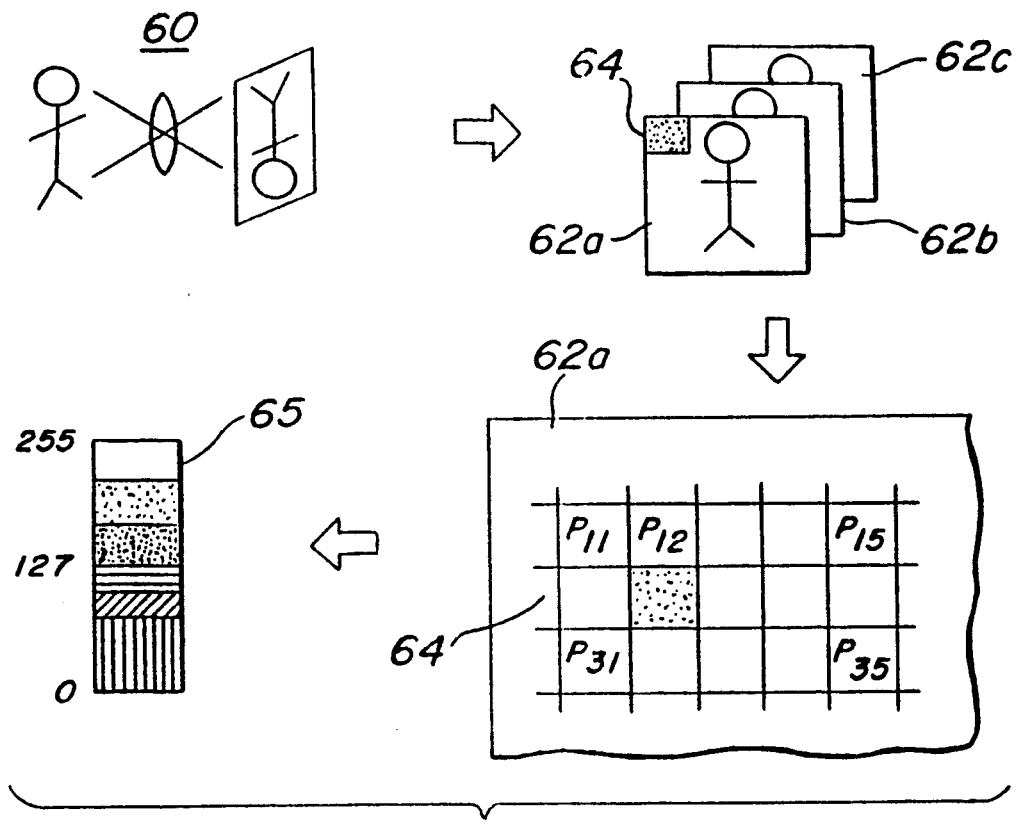
FIG. 3 graphically illustrates the concept of constructing input (image) vectors from pixels of image frames.
Figure 4:
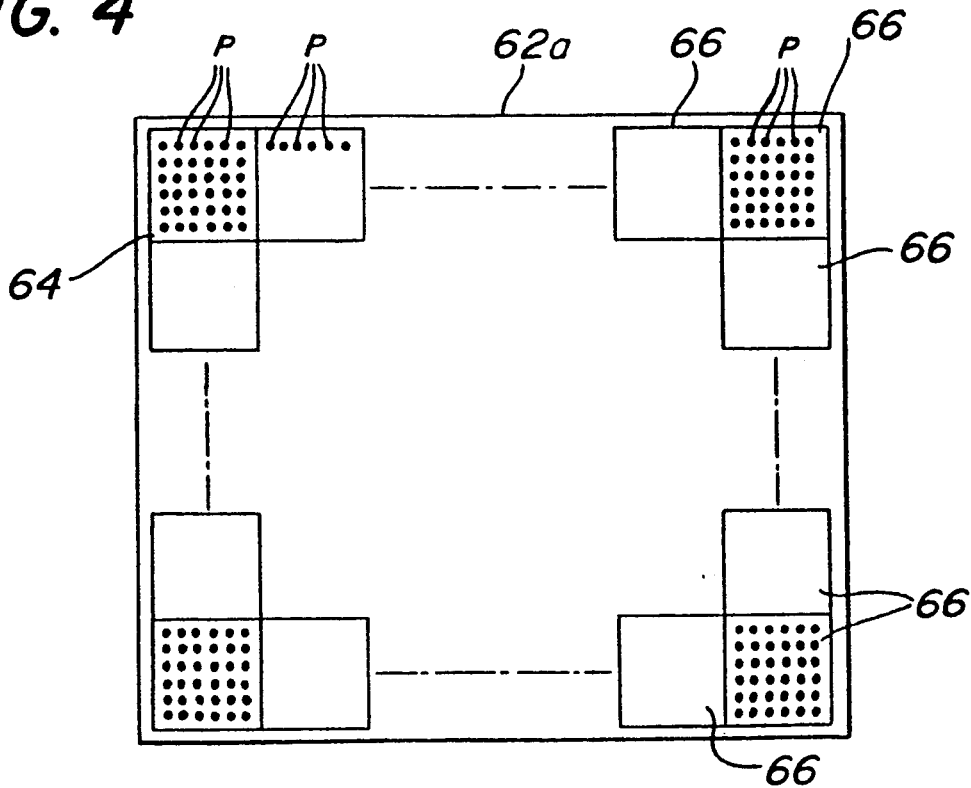
FIG. 4 graphically illustrates an image frame as defined by a plurality of pixels and organized into a plurality of sub-images.

FIG. 3 illustrates the concept of converting moving or dynamic images 60, such as program material 20 or 46, into input image vectors for vector quantization. The concept illustrated in FIG. 3 is well known. See, for example, R. L. Baker, "Vector Quantization of Digital Images", Ph.D. Dissertation, Stanford University, Department of Electrical Engineering (1984); Gray, R. M., "Vector Quantization", *IEEE ASSP Mag.*, Vol. 1, pp. 4,29 (April 1984); Goldberg, M., Boucher, P. R. and Shlien, S., "Image Compression Using Adaptive Vector Quantization", *IEEE Comm.*, Vol. COM-34 No. 2 (February 1986); and, Nasrabadi, N. M. and King, R. A., "Image Coding Using Vector Quantization; A Review", *IEEE Comm.*, Vol. 36, No. 8 (August 1988). As shown in FIG. 4, and as is common in the art, each of the temporally spaced image frames, e.g. 62a, 62b, 62c, etc., representing the moving image 60 is defined by a plurality of pixels P. In the case of a black and white image, each pixel P reports an intensity value, whereas in the case of a color image, each pixel may report luminance and chrominance values, or other values indicative of a color associated with the pixel.

As mentioned in the background section above, in vector quantization of an image frame, e.g., image frame 62a, the pixels P of each image frame are grouped into blocks that define sub-images 66 of each image frame. Each of these blocks, which is a matrix of pixels, defines an input image vector. Thus, in FIG. 3, a sub-image 64 of image frame 62a is represented by the block of pixels $P_{11}, P_{12}, \ldots P_{35}$. This matrix of pixels defines one input image vector for image frame 62a. Image frame 62a, as well as each succeeding image frame 62b, 62c, etc., will usually be represented by a plurality of input image vectors.

As graphically shown at 65 of FIG. 3, the intensity and/or color values reported by each pixel P are digitized (by the A/D converter shown at 22 and 48 of FIGS. 1 and 2). For example, each intensity or color value may be represented by an 8 bit digital word such that 256 intensity and/or color levels are possible for each pixel. Thus, in the case of a black and white image, only one input vector, containing the intensity values reported by each pixel in the block, is required for each block or sub-image. However, in the case of a color image, it may be desirable to provide several input image vectors for each block or sub-image, e.g., one input image vector containing intensity data and another containing color data. Another possibility is that three input image vectors are provided for each block in a color image, one containing Y data, another containing I data, and a third containing Q data. Alternatively, a three-dimensional vector quantization method may be employed to construct a single input vector containing the data in each of these vectors. In vector quantization, each of these input image vectors is then compared to the codevectors stored in the codebook to select a best match codevector for each.

It will be appreciated from the foregoing that, in the case of image data, input vectors will usually be multi-dimensional and usually have at least two dimensions (e.g., the matrix of intensity values shown in FIG. 3). However, there may be instances where input vectors are uni-dimensional, for example, where input vectors are constructed from the intensity values of only single rows or columns of pixels. Input vectors may have more than two dimensions, for example, where input vectors are constructed from pixel blocks of temporally spaced images (known as three-dimensional vector quantization), and/or where data in addition to intensity data (e.g., color) is included in each vector.

As described in the background, each of the input image vectors is compared to the codevectors stored in a VQ codebook to select a best match codevector for each. The encoders (e.g. 22 and 48 of FIG. 1) and decoders (e.g., 28, 38, and 46 of FIG. 1) of the present invention each employ a tree search VQ codebook. The construction and use of tree search codebooks to perform vector quantization is well known in the art. See, for example, the aforementioned article by R. M. Gray entitled "Vector Quantization", and the aforementioned Ph.D. dissertation of R. L. Baker entitled "Vector Quantization of Digital Images". See also the aforementioned Ph.D. dissertation of E. A. Riskin entitled "Variable Rate Quantization of Images", and, U.S. Pat. No. 4,878,230 of Murakami et al. entitled, "Amplitude Adaptive Vector Quantization System." The aforementioned article by Linde, Buzo and Gray entitled "An Algorithm for Vector Quantizer Design" describes one preferred method for constructing codebooks that may be employed in the practice of the present invention.

As is known to those skilled in the art, a typical tree search VQ codebook comprises a plurality of levels of codevectors arranged in a tree structure wherein each codevector represents a possible input vector. The codevectors at each successive level of the tree usually represent possible input vectors with greater accuracy than codevectors at a preceding level, and successive levels of the tree contain more codevectors than preceding levels. Each codevector has an associated ID code or label which uniquely identifies the codevector and provides a means for accessing the codevector from the codebook. In typical applications, VQ codebooks are stored in a digital electronic memory, and thus the ID codes or labels are the memory addresses of each codevector. As a result of the tree structure, the memory address of each codevector has a length which corresponds to the level of the tree at which the codevector resides. Thus, the memory addresses of codevectors at a same level have the same length, and the length increases with each successive level of codevectors.

Figure 5:
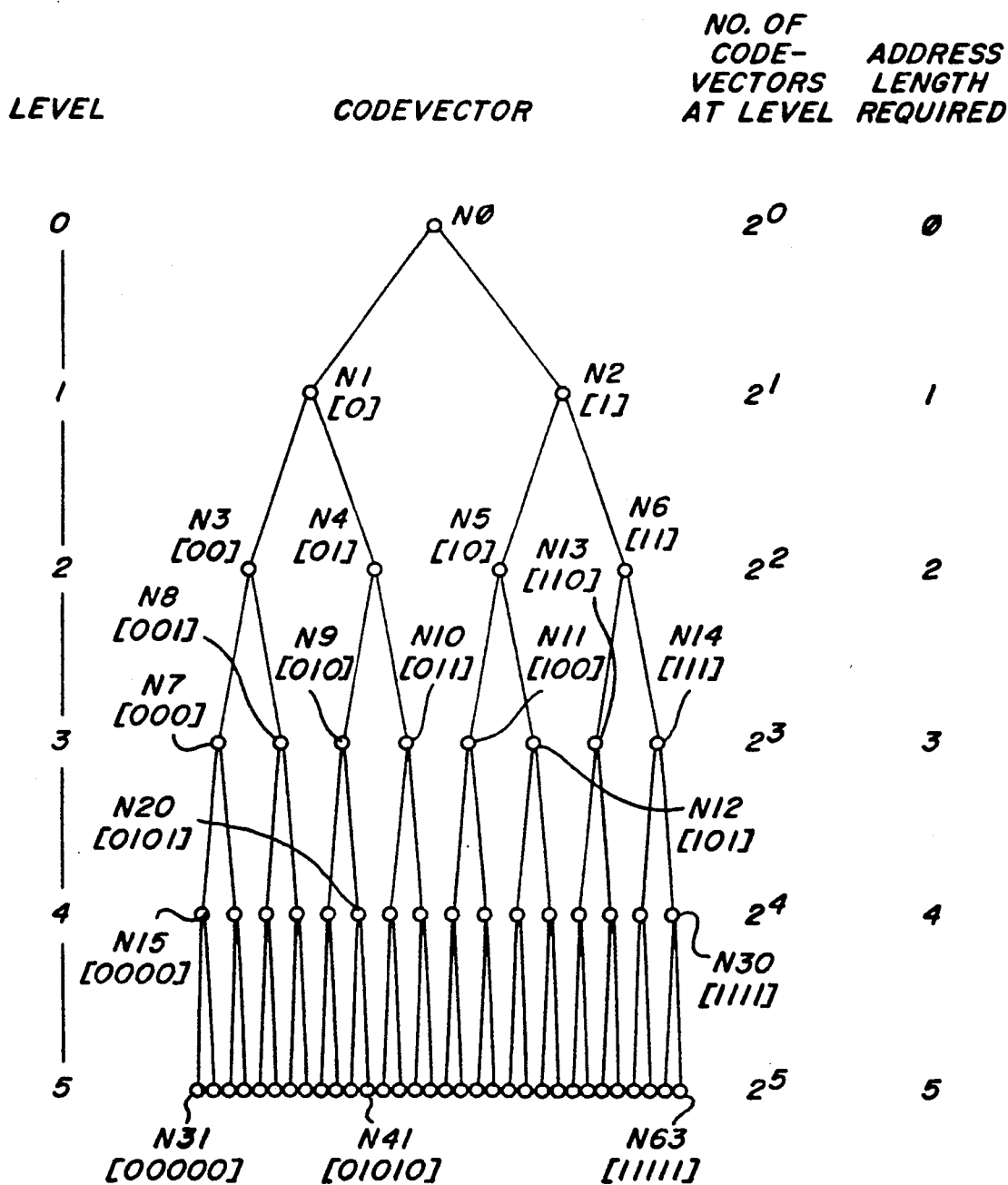
FIG. 5 illustrates the organization of an exemplary tree search VQ codebook that may be employed in accordance with the present invention.
Figure 6:
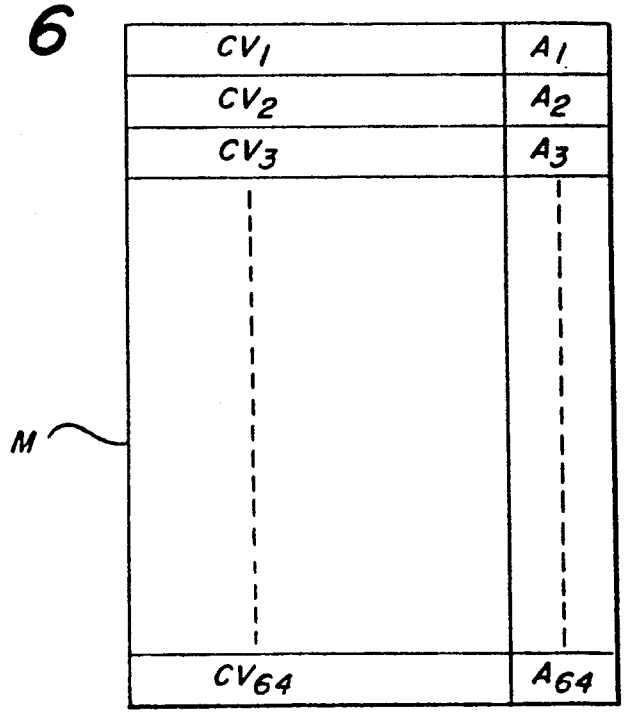
FIG. 6 illustrates an exemplary memory for storing a vector quantization codebook.

FIG. 5 graphically illustrates the structure of an exemplary tree search VQ codebook that may be employed in the present invention. As shown in the figure, the exemplary tree search VQ codebook comprises a plurality of levels 0-5 of codevectors wherein level 0 is defined by a root node N0 of the tree and subsequent levels are defined by additional nodes N1-N62 that are reached as branches B of the tree are traversed. Each node is, of course, a codevector, so the exemplary codebook of FIG. 5 has 63 codevectors N0-N62. The tree search VQ codebook of FIG. 5 may be stored in an electronic memory. FIG. 6 graphically illustrates an exemplary memory M containing the codevectors CV of a tree search codebook. Each codevector has an associated memory address A.

As mentioned above, in typical tree search codebooks such as the codebook of FIG. 5, the codevectors at successive levels represent possible input vectors with greater accuracy than codevectors at a preceding level. Thus, for example, the codevectors at level 5 of the exemplary tree of FIG. 5 may represent possible input vectors with greater accuracy than the codevectors at level 4, and the codevectors at level 4 may represent possible input vectors with greater accuracy than the codevectors stored at level 3, and so on. Also, each codevector has an associated address. Codevectors higher up in the tree (e.g., level 0 and ) have shorter addresses than codevectors lower in the tree (e.g., levels 4 and 5), because there are fewer choices in the upper levels than in the lower levels. For example, an address length of 5 bits is required to address the $2^5$ codevectors in level 5, whereas an address length of only 3 bits is required to address one of the $2^3$ codevectors in level 3, etc. For purposes of later discussion and in the drawings, the addresses of some codevectors are indicated in brackets ("[]").

Considering the structure of a tree search codebook in greater detail and referring to the tree search codebook of FIG. 5 as an example, it can be seen that successive levels of the tree search codebook are formed by branches B emanating from each node in a preceding level. Thus for example, from the root node N0, the first level of the tree search codebook of FIG. 5 is formed by the branches to N1 and N2; the second level is formed by the branches from N1 to N3 and N4 and the branches from N2 to N5 and N6. As shown in the Figure, two branches emanate from each node until the bottom level of the tree is reached. It is understood by those skilled in the art that while the tree search codebook of FIG. 5 has two branches emanating from each node, other tree search codebooks may be used in accordance with the present invention that have more branches emanating from each node.

The address length of each codevector depends upon the number of branches emanating from each node as well as the level of the tree at which the codevector resides. In typical applications, VQ codebooks are stored in a digital electronic memory wherein the addresses are binary. In general, then, the length of the binary address of a codevector at a given level (L) can be expressed as:

$$\text{Address Length} = L(\log_2 b) \text{ bits,}$$

where b = the number of branches emanating from each node. Thus, for example, in the tree search codebook of FIG. 5, where there are two branches emanating from each node, the codevectors of the first level of the codebook (residing at N1 and N2) require an address length of only 1 bit. The codevectors at each successive level of the tree search codebook of FIG. 5 require 1 additional address bit. The 5th level of the codebook, therefore, requires 5 address bits. Applying the formula above to a tree search codebook having four branches emanating from each node, each successive level of codevectors requires two additional address bits. Similarly, in a codebook having eight branches emanating from each node, each successive level of codevectors requires three additional address bits, and so on. In one preferred implementation, there are sixteen branches at each level and four bits are added as each new level of the tree is traversed.

With binary addressing, the address of a codevector (node) at a given level of the tree comprises the address of the parent node in the preceding level plus the number of bits necessary to distinguish that codevector from the other codevectors (nodes) having the same parent node. As described above the number of additional bits depends on the number of branches emanating from the parent node and can be expressed as:

$$\log_2 b \text{ bits,}$$

where b = the number of branches emanating from the parent node. Thus, for example, referring to the tree search codebook of FIG. 4 wherein two branches emanate from each node, the address of the codevector at N4 is [01] which comprises the address of the codevector at parent node N1 [0] plus an additional bit [1] to distinguish the codevector at N4 from the codevector at N3 which also has node N1 as a parent. Similarly, for example, the address of the codevector at N9 is [010] which comprises the address of the codevector at parent node N4 [01] plus an additional bit [0] to distinguish the codevector at N9 from the codevector at N10 which also has node N4 as a parent.

A necessary result of the structure described above, which is most important to the method of the present invention, is that if the address of a parent node at a given level L is known, the address of a codevector at a subsequent level L' can be specified with only $(L'-L)\log_2 b$ additional bits; in other words, having transmitted the full address of a codevector at a parent node in level L of the tree, only $(L'-L)\log_2 b$ additional bits need be transmitted to uniquely identify the codevector in level L' having that parent, because the $(L'-L)\log_2 b$ additional bits can be combined with the previously transmitted address of the parent node to obtain the full address of the codevector at the subsequent level L'.

The $(L'-L)\log_2 b$ additional bits needed to identify the codevector at level L' represent the difference between the address of the parent node at level L and the full address of the codevector at level L'. Thus, having transmitted the address of a codevector at a parent node in level L, only the difference between that address and the address of a codevector in a subsequent level need be transmitted to uniquely identify the subsequent codevector at a receiving location; the receiver can simply append the difference bits to the previously received address of the parent node to obtain the full address of the subsequent codevector For example, referring to the exemplary codebook of FIG. 5, suppose that the address of the codevector at parent node N9 [010] has been transmitted to a receiving location, and that the next address to be transmitted is the address of the codevector at node N41 [01010] which has node N9 as a parent. The address of the codevector at node N41 comprises the address of the codevector at parent node N9 [010] plus two additional bits [10] needed to distinguish the codevector at N41 from the other codevectors in the 5th level having node N9 as a parent (i.e., the codevectors at N39, N40 and N42). These additional bits easily can be produced for transmission by simply subtracting the address of the codevector at N9 from the full address of the codevector at N41 (i.e. [01010]−[010xx]=[10]). Because the address of the codevector at N9 [010] has already been transmitted, only the difference bits [10] need be transmitted to the receiver to specify the full address of the codevector at node N41. The receiver can append the difference bits [10] to the previously received address [010] to obtain the full address of the codevector at N41 (i.e., [010] & [10]=[01010], the & symbol indicating the append function). The significance of this result will become evident hereinafter.

In the prior art, vector quantization is commonly (but not always) carried out by searching each input vector all the way through to the bottom of the tree to find a single codevector at the bottom of the tree that most closely resembles the input vector. According to the present invention, however, as will be explained in detail below, a plurality of codevectors are selected for each input vector from varying levels of the tree. Each codevector is selected from a different level of the tree based on a corresponding plurality of distortion threshold values and codebook level threshold values. In the preferred embodiment, the plurality of codevectors comprises three codevectors that are selected based on three corresponding distortion threshold and codebook level threshold values.

In greater detail, an input vector (actually in the preferred embodiment a residual vector is employed) is compared to the codevectors at each successive level of the tree starting at the first level until the distortion measure between the input vector and a selected codevector at a given level satisfies the first distortion threshold value or until the level of the selected codevector exceeds the first codebook level threshold value. The selected codevector that satisfies either of these first threshold conditions represents the first selected codevector for the input vector. The address of the first selected codevector is then transmitted. The transmitted address represents a basic VQ signal. Comparison of the input vector then continues in the same manner from that level until the distortion measure between the input vector and a selected codevector at a subsequent level satisfies the second distortion threshold value or until the level of the selected codevector exceeds the second codebook level threshold value. The selected codevector that satisfies either of these second threshold conditions represents the second selected codevector for the input vector. Additionally, and most importantly, the first selected codevector is a parent of the second selected codevector. Accordingly, only the difference bits between the address of the second selected codevector and the address of the first selected codevector (i.e., the bits necessary to distinguish the second selected codevector from the first selected codevector) are transmitted. These difference bits represent a first enhancement signal to the basic signal; the second selected codevector, being from a lower level of the tree, generally represents the input vector more accurately than the first codevector. This process continues once more until a third codevector has been selected according to either the third distortion threshold value or the third codebook level threshold value. Similarly, only the difference bits between the address of the third selected codevector and the address of the second selected codevector are transmitted. The difference bits between the addresses of the second and third selected codevectors represent a second enhancement signal. It is understood that although the preferred embodiment employs three distortion threshold values and respective codebook level threshold values, any number of threshold values could be employed, and consequently, any number of enhancement signals could be transmitted.

Figure 7:
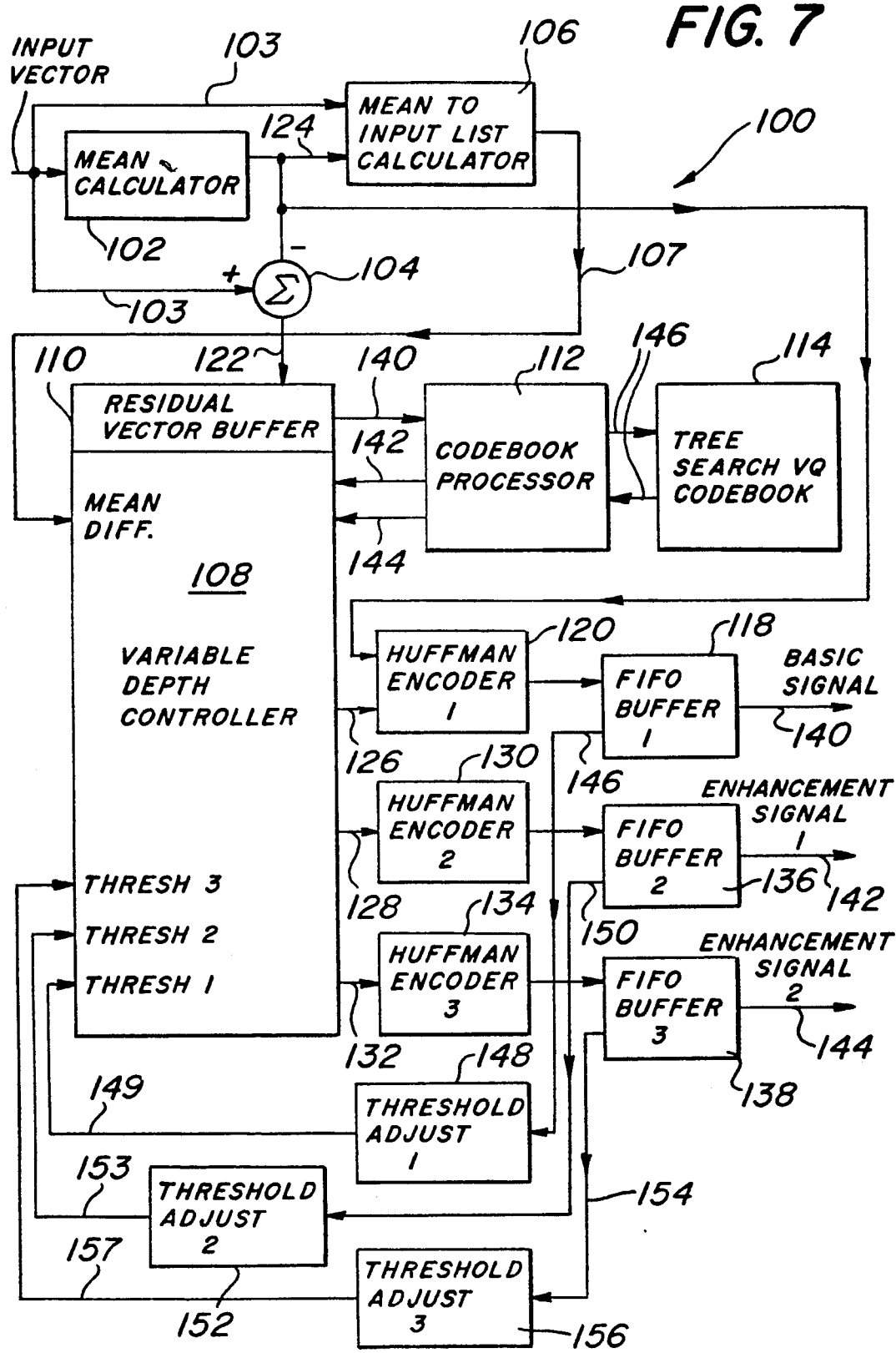
FIG. 7 is a block diagram of one embodiment of an encoder apparatus for carrying out the vector quantization compression method of the present invention.

At the receiving end, one or more of these enhancement signals may be combined with (appended to) the basic signal to obtain codevector addresses from successively lower levels of the tree, thereby increasing reproduction accuracy if desired. Additionally, according to the present invention, the thresholds may vary according to a "fullness measure" of a respective buffer (described hereinafter) that stores VQ data to be transmitted. In effect, the thresholds vary as a function of the average length of VQ data stored in the buffer. Alternatively, a threshold value may be derived and fixed for a predetermined number of images which causes those particular images to generate a fixed amount of compressed data. FIG. 7, which illustrates a VQ encoder apparatus for carrying out this method, and FIGS. 8-10 which illustrate the method in greater detail, will now be explained.

Referring first to FIG. 7, there is illustrated a VQ encoder apparatus 100 for carrying out the method of the present invention. An input vector (e.g., the digitized matrix 64 of pixel values taken from a portion of the image frame 62a) is received and supplied to a circuit 102 which computes the mean value of the input vector. The mean value is supplied on a line 124 to the "−" input of an adder circuit 104 which also receives at a "+" input, via line 103, the input vector itself. The mean value is also supplied to a Huffman encoder circuit 120 for purposes to be described hereinafter. The adder circuit 104 subtracts the mean value from the input vector to supply, on a line 122, a so-called "residual vector", which is the input vector with its mean value removed. As will become evident hereinafter, it is the residual vector that is used for searching the codebook to select the plurality of best match codevectors for the residual vector. This style of vector quantization, known as mean removed vector quantization (MRVQ), is well known in the art and has numerous advantages. See, for example, the aforementioned article by R. M. Gray entitled "Vector Quantization" and the aforementioned Ph.D. dissertation by R. L. Baker entitled "Vector Quantization of Digital Images". Although the invention is described herein as employing MRVQ, this is simply the preferred embodiment, and the invention is not limited to use of MRVQ, except as may be expressly set forth in the accompanying claims. Rather, if desired, the input vector itself, or some other variant thereof, may be used to carry out the codebook search to select the best match codevectors (in the claims, the term "processed input vector" has been employed to cover all such possibilities).

As shown, the mean value is also provided on line 124 to one input of a mean value to input vector distortion calculator 106, and the input vector is also provided on line 103 to another input of calculator 106. The function of the calculator 106 is to calculate a measure of difference between the mean value and input vector. This may be performed by converting the mean value to a vector, then computing a measure of difference between the mean vector and input vector by any well known technique, such as by computing the absolute difference of the vectors, or by computing the square root of the difference between the squares of the two vectors.

The difference is supplied, via line 107, to a variable depth controller 108. The controller 108, Which functions in accordance with the flowchart of FIGS. 8a(1), 8a(2), 8b and 8c, is responsible for carrying out variable depth vector quantization on each residual vector. As will become evident hereinafter, if the difference between the mean value and the input vector is less than a first threshold, the variable depth controller 108 does not vector quantize this particular input vector at the first threshold, but, as shown in the flowchart, a determination is made as to whether vector quantization should occur at a second threshold. (Alternatively, if the difference between the mean value and the input vector is less than the threshold, the input vector could still be vector quantized and the result discarded. This approach offers the advantage that the hardware implementation may be simpler.) On the other hand, if the difference exceeds the threshold, then the controller 108 carries out vector quantization for the first threshold (and, if appropriate, the following thresholds as well), as described in greater detail in conjunction with the flowchart of FIGS. 8a(1), 8a(2), 8b and 8c, by conducting a search for codevectors at successive levels of the tree search codebook that best match the residual vector.

The residual vector calculated by adder 104 is provided via line 122 to a residual vector buffer 110. Buffer 110 stores the residual vector in the event that vector quantization is to be performed on the residual vector. In such case, the residual vector is provided to a codebook processor 112 via line 140. A preferred circuit for the codebook processor 112 is disclosed in U.S. Pat. No. 5,031,037 entitled "Method and Apparatus for Vector Quantizer Parallel Processing." The codebook processor 112 bi-directionally communicates with a tree structured codebook 114 (of the type previously described) via a pair of lines 146. As the codebook 114 is traversed, and the residual vector is compared to the codevectors at each successive level, the codebook processor 112 provides, on a line 142, the address of the best match codevector at each level, and also provides, on a line 144, a measure of distortion between each best match codevector and the current residual vector. The measure of distortion for each best match codevector may be computed in the same manner as the measure of difference between the mean value and input vector is carried out. The manner in which these measures of distortion are employed will become evident hereinafter.

As mentioned above, and as described hereinafter in greater detail, the variable depth controller 108 selects, if necessary, a plurality of codevectors for each residual vector. Each codevector is selected from a different level of the codebook and selection occurs at successively lower levels as the branches of the tree are traversed. In the preferred embodiment, three codevectors are selected for each residual vector. The variable depth controller provides, on a line 126, the address of the first selected codevector. As shown, this address is preferably provided to the input of a first Huffman encoder 120. As described previously, the mean value provided by the calculator 102 is also provided to the first Huffman encoder 120. As will be appreciated hereinafter, when the measure of distortion between the mean value and the residual vector calculated by calculator 106 is less than a first distortion threshold value, then only the mean is supplied to the Huffman encoder 120, i.e., vector quantization for this particular input vector is not performed and therefore no address data is provided on line 126 by the controller 108. (Alternatively, if the difference between the mean value and the input vector is less than the threshold, the input vector could still be vector quantized and the result discarded. This approach offers the advantage that the hardware implementation may be simpler.) In such event, it will be necessary to insert a code to indicate to a receiver of VQ data that only the mean value, and no address data, has been transmitted for this particular input vector.

The controller 108 provides at least a portion of the address of the second selected codevector on line 128. The portion of the address of the second selected codevector is preferably provided to a second Huffman encoder 130. The portion of the address of the second selected codevector, in combination with the address of the first selected codevector, uniquely identifies the second selected codevector (i.e., forms the complete address of the second selected codevector).

Similarly, the controller 108 provides at least a portion of the address of the third selected codevector on a line 132. The portion of the address of the third selected codevector is preferably provided to a third Huffman encoder 134 The portion of the address of the third selected codevector, in combination with the address of the first selected codevector and the portion of the address of the second selected codevector, uniquely identifies the third selected codevector (i.e., forms the complete address of the third selected codevector).

The controller 108 may convey the address of the first selected codevector on line 126 in either a fixed rate or variable rate form. Similarly, the portions of the addresses of the second and third selected codevectors may be conveyed on lines 128, 130 respectively in either a fixed rate or variable rate form. In variable rate form, the length of the addresses will vary as the level at which the codevectors are selected varies. Alternatively, the controller 108 may always convert the variable length addresses to a fixed length so as to provide the address data in a fixed rate form, e.g., by appending an appropriate number of leading or trailing 1's or 0's to the variable rate address.

Huffman encoders, e.g., 120, 130 and 134, are well known in the art. While many different variations of Huffman encoders are known, all operate on essentially the same principle. A Huffman encoder is a lossless data compressor that, using a lookup table, assigns compression codes (addresses) based on the statistical probability that a particular entry in the lookup table will be addressed. That is, the greater the probability that a particular entry in the lookup table will be addressed, the shorter the compression code. Thus, the function of the Huffman encoders 120, 130, 134 is to assign compression codes to each address or portion of an address received on lines 126, 128, 132 respectively. The compression code assigned to each address or portion of an address received on lines 126, 128 or 132 has a length that is inversely proportional to a predetermined probability that the codevector associated with that address (or portion of an address) will be selected from the codebook 114. The Huffman encoder 120 also assigns compression codes to the mean values from the calculator 102 according to the same criteria.

Although Huffman encoders have been shown for compressing the mean values and VQ (address) data, any lossless data compressor may be employed, however, Huffman encoders are preferred.

The output of each Huffman encoder 120, 130, 134 is provided to the input of a respective first-in-first-out (FIFO) buffer 118, 136, 138. It is understood by those skilled in the art that the Huffman encoders 120, 130, 134 are not required (but may be employed) when variable rate data is provided on lines 126, 128 and 132. Rather, the variable rate data may be provided directly to the respective buffers 118, 136, 138 (for purposes described hereinafter). Additionally, it is not absolutely necessary to Huffman encode the mean values provided by the mean calculator 102. Thus, if desired, mean values may be provided directly to the input of the first buffer 118 as well. However, use of the Huffman encoders 120, 130, and 134 is preferred. A clock (not shown) coupled to each buffer 118, 136, 138 serially clocks in data from the Huffman encoders 120, 130, 134 respectively while synchronously transmitting out data stored in the buffers on lines 140, 142 and 144 respectively. The address data output on line 140 (i.e., the address of the first selected codevector for each input vector) represents a basic VQ signal. The address data output on line 142 (i.e., the portion of the address of the second selected codevector) represents a first enhancement signal to the basic signal. Finally, the address data output on line 144 (i.e., the portion of the address of the third selected codevector) represents a second enhancement signal to the basic signal. Output lines 140, 142, and 144 together correspond to the output of blocks 22 and 48 of FIGS. 1 and 2.

As previously mentioned, the first, second and third selected codevectors are selected according to corresponding first, second and third distortion threshold values and/or codebook level threshold values respectively. The magnitudes of these thresholds affect the levels at which the codevectors are selected. In the preferred embodiment, these thresholds vary according to a measure of "buffer fullness", or unused capacity of a respective FIFO buffer. For example, the first distortion threshold and first codebook level threshold, which control the selection of the first selected codevector, vary according to a measure of fullness of the first buffer 118. The measure of fullness of the first buffer 118 is provided on a line 146 to a threshold adjust circuit 148 which is responsive to the measure of buffer fullness to increase or decrease the magnitudes of the first distortion threshold value and codebook level threshold value. Similarly, the second distortion threshold and second codebook level threshold values, which control the selection of the second selected codevector, vary according to a measure of fullness of the second buffer 136. The measure of fullness of the second buffer 136 is provided on a line 150 to a second threshold adjust circuit 152 which is responsive to the measure of buffer fullness of the second buffer 136 to increase or decrease the magnitudes of the first distortion threshold value and codebook level threshold value. Likewise, the third distortion threshold and codebook level threshold values, which control the selection of the third selected codevector, vary according to a measure of fullness of the third buffer 138. The measure of fullness of the third buffer 138 is provided on a line 154 to a third threshold adjust circuit 156 which is responsive to the measure of buffer fullness of the third buffer 138. The adjusted first, second and third distortion thresholds and codebook level thresholds are provided to the controller 108 via lines 149, 153 and 157 respectively.

Using the first buffer 118 as an example, when the signal on line 146 indicates that unused buffer capacity is decreasing (as a result of incoming VQ data filling the buffer faster than it is being transmitted out), the threshold adjust circuit 148 automatically increases the magnitude of the first distortion threshold value and automatically decreases the magnitude of the first codebook level threshold value. Similarly, when the signal on line 146 indicates that unused buffer capacity is increasing (as a result of VQ data being transmitted out faster than new VQ data is filling it), the threshold adjust circuit 148 automatically decreases the magnitude of the first distortion threshold value and automatically increases the magnitude of the first codebook level threshold value. Co-pending U.S. Patent application Ser. No. 365,940, filed Jun. 13, 1985 entitled "Method and Apparatus for Data Compression With Reduced Distortion" discloses another application of a circuit that employs a measure of buffer fullness to adjust a value.

It will be appreciated that increasing the magnitude of a distortion threshold value will increase the measure of difference that will be permitted between the input vector (or residual thereof) and the codevector selected at a given level, thereby decreasing the level to which searches are conducted through codebook 114. Decreasing a distortion threshold value will have an opposite effect. It will also be appreciated that decreasing a codebook level threshold will decrease the maximum level to which searches for a given codevector can be conducted. Increasing a codebook level threshold will have an opposite effect. Thus, considering the first buffer 118 as an example, increasing the first distortion threshold value and/or decreasing the first codebook level threshold value will decrease the average length of the variable rate addresses provided on line 126 (when controller 108 is programmed to provide variable rate addresses thereon), and therefore will decrease the average length of compression codes provided by Huffman encoder 120. Decreasing the first distortion threshold and/or increasing the first codebook level threshold will, of course, have an opposite effect. It will thus be seen that, as the buffer 118 begins to approach its maximum capacity, the first distortion threshold and first codebook level threshold may be adjusted to effectively shorten the length of subsequent input data to the buffer 118 when variable rate data is being provided by the controller 108. When the Huffman encoder 120 is employed, threshold adjustment will affect the length of the compression codes as well. Thus, over time, the buffer 118 will have an average capacity of preferably 50%. More importantly, however, automatic adjustment of the thresholds guarantees that the buffer 118 will not empty or overflow as a result of storing variable length data (i.e., either variable length compression codes from the Huffman encoder 120 or variable length addresses from the controller 108) while transmitting the same on line 140 at a fixed data rate. It is understood that the buffers 130 and 134 operate in a similar manner. The apparatus of FIG. 7 may be employed to implement blocks 22 and 48 of FIGS. 1 and 2.

As an alternative, the value of the threshold can be determined for one or more images. In this case, the value of the threshold is chosen by the encoder which causes those particular frames to generate the required fixed amount of data to match the transmission channel capacity. The value of the threshold can be found by the encoder, for example, using trial and error or an iterative search technique.

Figure 8B:
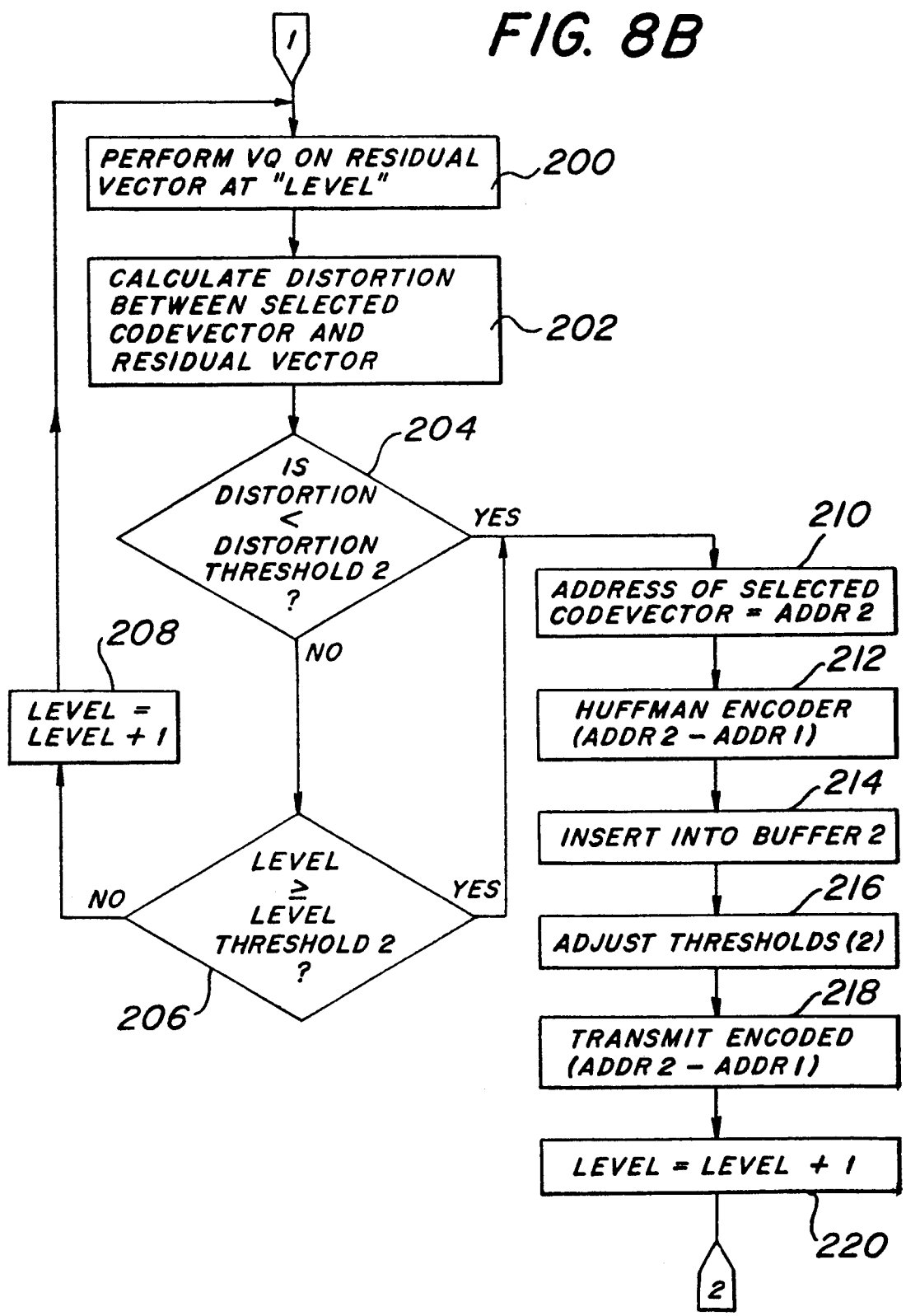
FIGS. 8a(1), 8a(2), 8b and 8c comprise a flowchart illustrating both the operation of the apparatus of FIG. 7 and one preferred embodiment for carrying out the vector quantization compression method of the present invention.

FIGS. 8a(1), 8a(2), 8b and 8c comprise a flowchart illustrating the operation of the circuit of FIG. 7, and particularly the operation of controller 108. Beginning with FIG. 8a, upon receipt of an input vector, its mean value is calculated as shown at step 158, then the difference (distortion) between the mean and input vector is calculated, as shown at step 160. At step 162, the difference is compared to the first distortion threshold value ("distortion threshold1" in the Figure). If the difference is less than the first distortion threshold value, then the mean value is Huffman encoded as shown at step 164, and the Huffman code is stored in the buffer 118, as shown at step 166. Then, as shown at step 168, the first distortion threshold and the first codebook level threshold are adjusted based upon the measure of buffer fullness. At some time after the Huffman encoded mean value has been clocked through the buffer 118 to the output 140, it is transmitted, as shown at step 170. In the preferred embodiment, processing of the current input vector is not yet completed since it must be determined whether encoding (vector quantization) must be performed for the second (and following) threshold(s). Thus, after step 168 has been performed, steps 200 et seq. (FIG. 8b) are performed for the same input vector. Alternatively, after step 168 is performed, processing of the current input vector could continue at step 172 et seq., as described hereinafter, but the result discarded for the encoded value corresponding to the first threshold.

If, at step 162, it was determined that the difference between the mean value and input vector exceeded the first distortion threshold, then vector quantization is performed upon the residual vector calculated for the current input vector. (Alternatively, if the difference between the mean value and the input vector is less than the threshold, the input vector could still be vector quantized and the result discarded, although the process should still be repeated for the second and third thresholds). This approach offers the advantage that the hardware implementation may be simpler.) Steps 172 through 242 (FIGS. 8a(1), 8a(2), 8b and 8c) illustrate the manner in which vector quantization is performed for the residual vector according to the present invention. The controller 108, in cooperation with the codebook processor 112 and the tree search codebook 114, is responsible for carrying out steps 172 through 242 of FIGS. 8a(1), 8a(2), 8b and 8c.

To perform vector quantization for a new residual vector, an initial level (e.g., the first level) of the tree structured codebook 114 is selected, as shown at step 172. Next, as shown at step 174, vector quantization is performed on the residual vector at this level to select the codevector at this level that most closely resembles the residual vector. At step 176, a measure of distortion is calculated between the current selected codevector and the residual vector, and, at step 178, this measure of distortion is compared to the first distortion threshold. If the measure of distortion exceeds the threshold (i.e., does not satisfy the threshold condition), then the current level of the codebook, from which the codevector was selected, is compared to the first codebook level threshold value, as shown in step 180. If the current level is less than the first codebook level threshold value (i.e., the current level is higher up in the tree than the first threshold level), then the next level of the codebook is selected, as shown at step 182, and, steps 174 through 180 are repeated for this next level of the codebook. The loop defined by steps 174 through 182 is repeated, for each subsequent level of the codebook, until the measure of distortion between the selected codevector at a particular level and the residual vector is less than the first distortion threshold (step 178), or until the first codebook level threshold has been reached (step 180).

When a first codevector has been selected (at either step 178 or step 180), its address is stored as a variable (ADDR1), as shown at step 184. Then the address of the first selected codevector and the mean value associated with the current input vector, are Huffman encoded, as shown at step 186, and these Huffman codes are inserted into the first buffer 118 as shown at step 188. The first distortion threshold and first codebook level threshold values are thereafter adjusted as shown at step 190, and, when the Huffman codes for the address of the first selected codevector and for the mean value of the current input vector have been clocked through the first buffer 118, they are transmitted as shown at step 192. The transmitted mean and address of the first selected codevector comprise a basic VQ signal. At step 194, the next level of the codebook is selected, and control passes to step 200 as shown in FIG. 8b. FIG. 8b illustrates a second "stage" of the method of the present invention.

At step 200, vector quantization is performed on the residual vector at the current level (i.e., the next level selected at step 194) to select the codevector at this level that most closely resembles the residual vector. As shown at step 202, a measure of distortion is calculated between the selected codevector and the residual vector, and, at step 204, this measure of distortion is compared to the second distortion threshold. If the measure of distortion exceeds the second distortion threshold (i.e., does not satisfy the threshold condition), then the current level of the codebook, from which the codevector was selected, is compared to the second codebook level threshold value, as shown in step 206. If the current level is less than the second codebook level threshold value (i.e., the current level is higher up in the tree than the second threshold level), then the next level of the codebook is selected, as shown at step 208, and, steps 200 through 206 are repeated for this next level of the codebook. The loop defined by steps 200 through 208 is repeated, for each subsequent level of the codebook, until the measure of distortion between the selected codevector at a particular level and the residual vector is less than the second distortion threshold (step 204), or until the second codebook level threshold has been reached (step 206).

Figure 8C:
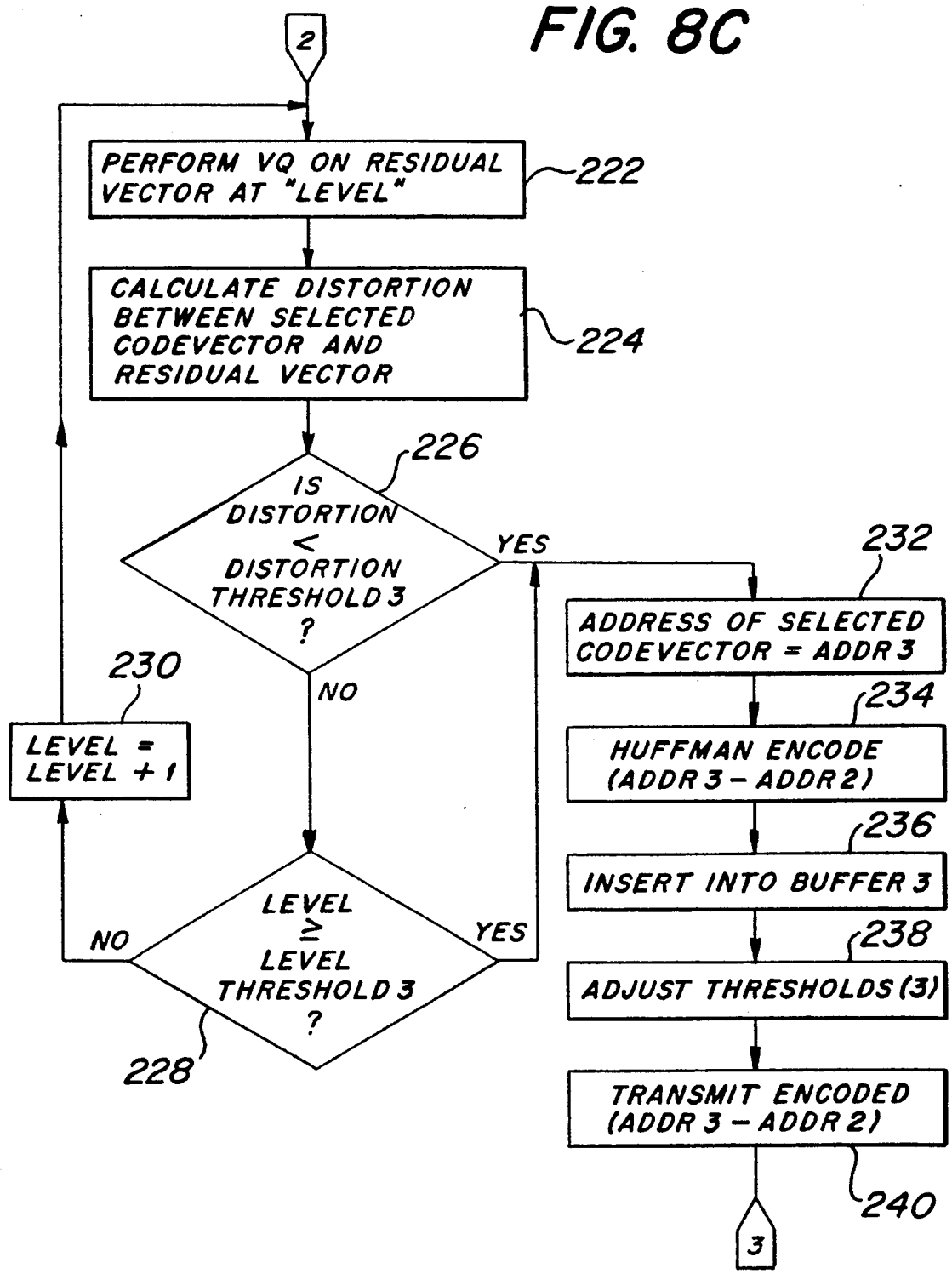

When a second codevector has been selected (at either step 204 or step 206), its address is stored as a variable (ADDR2), as shown at step 210. Then, the portion of the address of the second selected codevector that represents the difference between the address of the first selected codevector (stored in ADDR1) and the address of the second selected codevector (ADDR2) is Huffman encoded, as shown at step 212, and the Huffman encode portion is inserted into the second buffer 136 as shown at step 214. As described above, the portion of the address of the second codevector, when combined with the address of the first selected codevector, provides the full address of the second selected codevector. The second distortion threshold and second codebook level threshold values are thereafter adjusted as shown at step 216, and, when the Huffman code for the portion of the address of the second selected codevector has been clocked through the second buffer 136, it is transmitted as shown at step 218. The transmitted portion of the address of the second selected codevector represents a first enhancement signal to the basic signal. At step 220, the next succeeding level of the codebook is selected, and control passes to step 222 as shown in FIG. 8c. FIG. 8c illustrates the third "stage" of the method of the present invention.

At step 222, vector quantization is performed on the residual vector at the current level (i.e., the next level selected at step 220) to select the codevector at this level that most closely resembles the residual vector. As shown at step 224, a measure of distortion is calculated between the selected codevector and the residual vector, and, at step 226, this measure of distortion is compared to the third distortion threshold. If the measure of distortion exceeds the third distortion threshold (i.e., does not satisfy the threshold condition), then the current level of the codebook, from which the codevector was selected, is compared to the third codebook level threshold value, as shown in step 228. If the current level is less than the third codebook level threshold value (i.e., the current level is higher up in the tree than the third threshold level), then the next level of the codebook is selected, as shown at step 230, and, steps 222 through 228 are repeated for this next level of the codebook. The loop defined by steps 222 through 230 is repeated, for each subsequent level of the codebook, until the measure of distortion between the selected codevector at a particular level and the residual vector is less than the third distortion threshold (step 226), or until the third codebook level threshold has been reached (step 228). In the preferred embodiment, the third codebook level threshold is set to the last level of the codebook.

When a third codevector has been selected (at either step 226 or step 228), its address is stored in a variable (ADDR3), as shown at step 232. Then, the portion of the address of the third selected codevector that represents the difference between the address of the second selected codevector (stored in ADDR2) and the address of the third selected codevector (ADDR3) is Huffman encoded, as shown at step 234, and the Huffman encoded portion is inserted into the third buffer 138 as shown at step 236. The portion of the address of the third codevector can be combined with the portion of the address of the second selected codevector and the address of the first selected codevector to provide the full address of the third selected codevector. The third distortion threshold and third codebook level threshold values are thereafter adjusted as shown at step 238, and, when the Huffman code for the portion of the address of the third selected codevector has been clocked through the third buffer 138, it is transmitted as shown at step 240. The transmitted portion of the address of the third selected codevector comprises a second enhancement signal to the basic signal.

Control then passes back to step 158 where the process is repeated for the next input vector. Although in the preferred embodiment three distortion threshold values and corresponding level threshold values are employed, any number of threshold values could be employed (in the claims, the phrases "plurality of distortion threshold values" and "corresponding plurality of codebook level threshold values" have been employed to cover all such possibilities). With additional threshold values, more codevectors would be selected for each input vector. Each additional threshold value would provide an additional "stage" to the method illustrated in FIGS. 8a(1), 8a(2), 8b and 8c. Furthermore, as those skilled in the art understand, the apparatus of FIG. 7 would require an additional Huffman encoder, buffer, and threshold adjust circuit for each additional distortion threshold and corresponding level threshold.

As described above, in the preferred embodiment, the threshold values are each adjusted once between the receipt of each new input vector. Since an image is generally represented by a plurality of input vectors, the method shown in FIGS. 8a(1), 8a(2), 8b and 8c may adjust the magnitude of each threshold value many times for a single image frame. However, if desired, the threshold values may be adjusted only between image frames. Thus, it may be desired to adjust the thresholds only in-between the time that a last input vector for one image frame and a first input vector for a subsequent image frame are received.

Also, as described above, the portions of the addresses of the second and third selected codevectors are obtained by subtracting the full address from the previously selected address (i.e., the difference bits are sent). It is understood by those skilled in the art that, although in the preferred embodiment the difference bits are obtained by subtracting the subsequent address from the previous address, these bits could be obtained in any manner. For example, if the first codevector is selected from level L1 and the second codevector is selected from L2, rather than transmitting the difference between these two addresses, the transmitter simply could transmit the $(L2-L1)\log_2 b$ least significant bits of the address of the second selected codevector. The same bits are transmitted either way, and the present invention is not limited to any one method of obtaining these additional bits for transmission.

Figure 9:
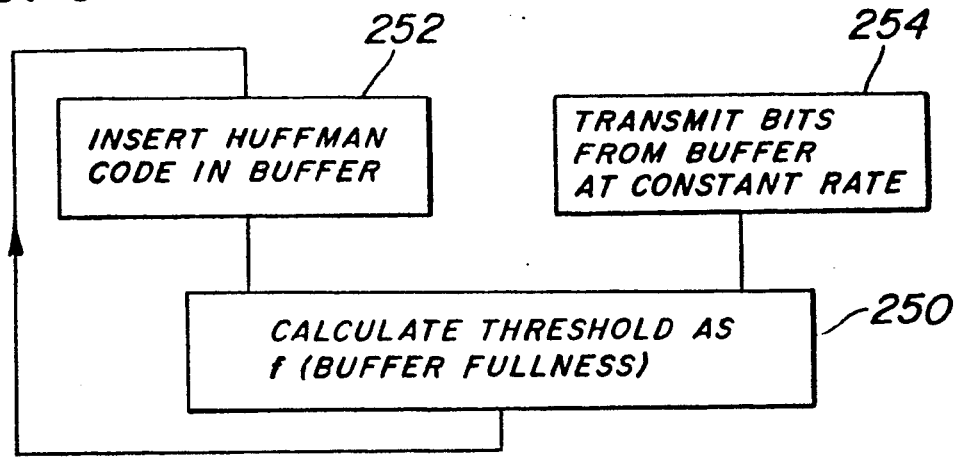
FIG. 9 is a flowchart illustrating further details of the operation of the apparatus of FIG. 7.

FIG. 9 illustrates, in flowchart form, how each distortion threshold value and corresponding codebook level threshold value is adjusted according to the preferred embodiment of the invention. Specifically, FIG. 9 illustrates the adjustment of one of the distortion threshold values. In the Figure, as Huffman codes (or variable rate addresses) are inserted into the buffer, e.g. buffer 118, (step 252), and also as serial data is transmitted out of the buffer at a fixed data rate (step 254), the distortion threshold value is recalculated as a function of buffer fullness (step 250). As previously mentioned, however, the threshold values provided to the controller 108 are adjusted only once for each input vector.

As mentioned, data bits are serially transmitted from each of the buffers 118, 136, 138.

Figure 10:
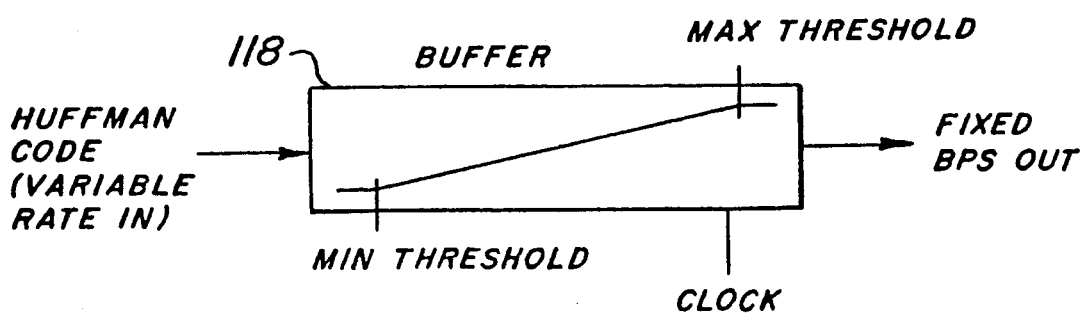
FIG. 10 is a block diagram illustrating further details of the apparatus of FIG. 7 and the method of FIG. 8.

FIG. 10 graphically illustrates the concept of employing buffer fullness to adjust a distortion threshold value. As shown, for a given buffer, e.g. buffer 118, remaining buffer capacity varies as a function of the length of the variable rate input data (either the Huffman codes or the variable rate addresses), since data is transmitted from the buffer at a fixed data rate. As shown by the line inside the buffer, e.g. buffer 118, of FIG. 10, the distortion threshold value increases toward a maximum as unused capacity decreases, and the distortion threshold value decreases toward a minimum as unused buffer capacity increases. Theoretical considerations for establishing minimum and maximum distortion threshold values are:

Min threshold = 0;
Max threshold = absolute value of [maxpix − minpix] * numpix;
or,
Max threshold = [maxpix − minpix]$^2$ * numpix;
where:
maxpix = maximum grey level of pixels;
minpix = minimum grey level of pixels;
numpix = block (sub-image) size However, in practice, max threshold can be set to a value smaller than the theoretical maximum since the theoretical value is not likely to ever occur. This ensures better buffer utilization without requiring an excessively large buffer. The adjustment of the codebook level threshold values can be performed in a similar manner, however, as mentioned above, the codebook level thresholds increase as unused buffer capacity increases, and decrease as unused capacity decreases.

Figure 11:
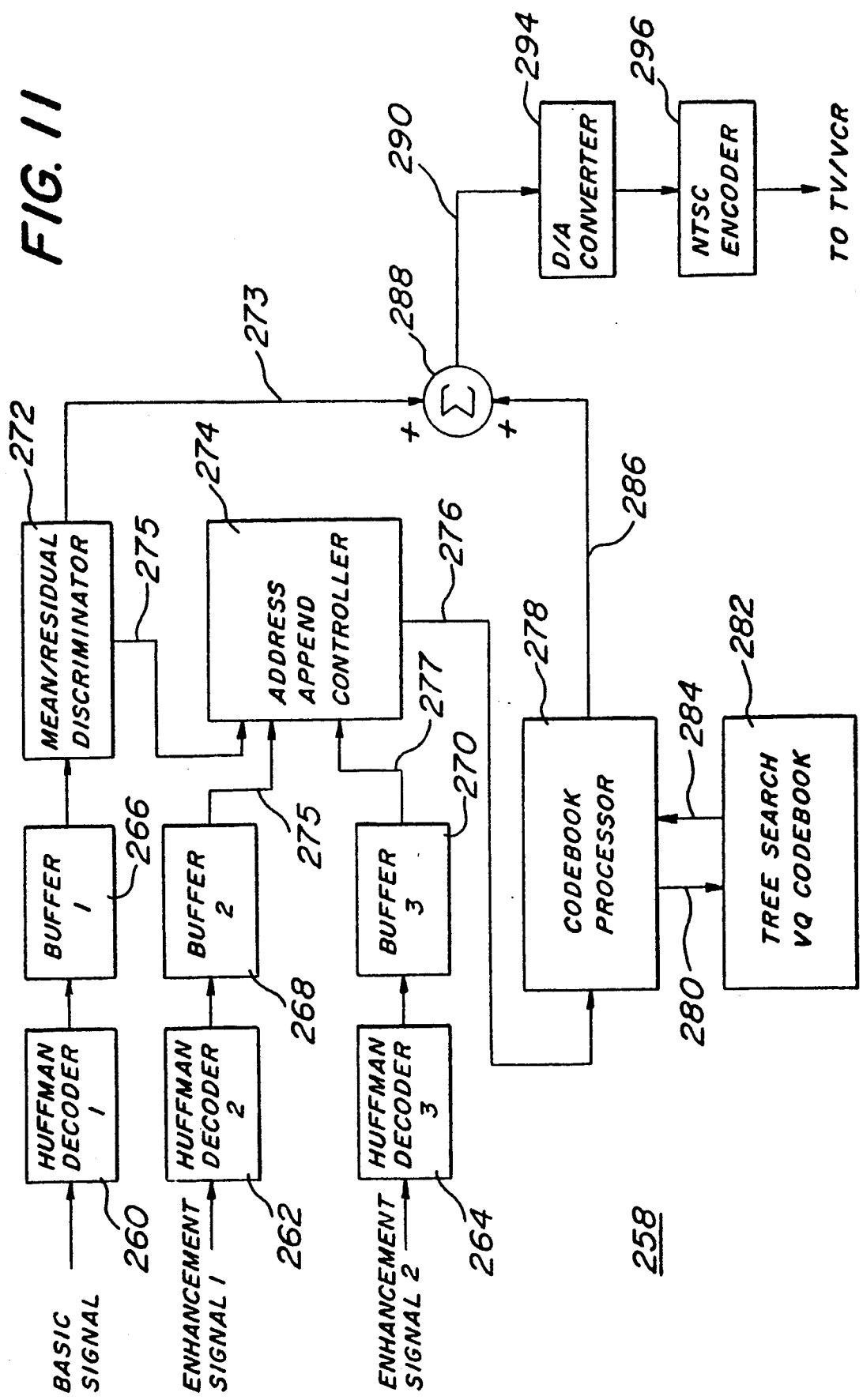
FIG. 11 is a block diagram of one embodiment of a decoder apparatus for carrying out vector quantization decompression according to the present invention.

Referring now to FIG. 11, there is shown a block diagram of an apparatus (decoder) 258 for receiving the basic VQ signal and the first and second enhancement signals transmitted by the buffers 118, 136 and 138 respectively, and for reproducing the image data from the received signals. The apparatus of FIG. 11 may be employed to implement blocks 28, 38 and 52 of FIGS. 1 and 2.

As shown, first, second and third Huffman decoders 260, 262, 264 receive the basic signal and the first and second enhancement signals, respectively, for decoding the received address data. The first Huffman decoder 260 also decodes the mean values in the basic signal. Each Huffman code received by the first decoder 260 represents the address of the first selected codevector for a given input vector and/or the mean value of that input vector. Each Huffman code received by the second decoder 262 represents a portion of the address of the second selected codevector for a given input vector that in combination with the address of the first selected codevector for that input vector forms the full address of the second selected codevector. Each Huffman code received by the third decoder 264 represents a portion of the address of the third selected codevector for a given input vector that in combination with the address of the first selected codevector for that input vector and the portion of the address of the second selected codevector for that input vector forms the full address of the third selected codevector. The decoders 260, 262 and 264 convert the received Huffman codes to the same data that was input to the first, second and third Huffman encoders 120, 130 and 134 in FIG. 7.

The decoded data from each decoder 260, 262, 264 is stored in an associated buffer 266, 268, 270, respectively. Each buffer preferably stores a full frame of data.

A discriminator circuit 272 is coupled to the first buffer 266 for determining whether a mean only was transmitted or whether both a mean and an address of a first selected codevector were transmitted. Remember, in some cases, only the mean value of an input vector is transmitted (i.e., no codevectors were selected for that input vector). This occurs when the difference between the mean value and the input vector satisfies the first distortion threshold value at the encoder, although there could be address data in one or both of the enhancement signals. As mentioned, in such cases the encoder must append additional information bits to the mean value to alert the decoder that only a mean has been transmitted. Thus, the discriminator 272 simply checks for these information bits. If the discriminator 272 determines that a mean only was transmitted, the discriminator 272 transforms the mean value to a vector and transmits the mean vector to the adder circuit 288 via a line 273 where it is added to a NULL vector (supplied on a line 286 as described hereinafter). The mean vector is then provided, on a line 290, to an image frame store 292 where it is stored in digital form. The mean vector is then converted to analog form by a Digital-to-Analog converter 294 and encoded in NTSC format by an NTSC encoder 296 for display on a television or VCR.

If the discriminator 272 determines that a mean value and an address of a first selected codevector were transmitted, the mean is passed to the adder circuit 288 via line 273, and the address of the first selected codevector is passed, via line 285, to the Address Append Controller 274. Also, in such situations, the Address Append Controller 274 receives the portions of the second and third selected codevectors via lines 275 and 277 respectively (i.e., the enhancement signals). As described hereinafter in greater detail, the Address Append Controller 274 may append the portion of the address of the second selected codevector to the address of the first selected codevector to form the full address of the second selected codevector, or it may append both portions to the address of the first selected codevector to form the full address of the third selected codevector. The full address is then provided via line 276 to a codebook processor 278 that may be identical to the codebook processor 112 of FIG. 7. The apparatus 258 of FIG. 11 is also provided with a tree structured codebook 282 which is identical to the tree structured codebook 114 of the encoder apparatus 100 of FIG. 7. The address on line 276 provided by the Address Append controller 274 is employed by the codebook processor to retrieve the identical codevector (e.g., the first, second or third selected codevector depending on whether the portions where appended) which was found to be the best match codevector by the encoder 100 of FIG. 7. This codevector, which actually represents a residual codevector, is supplied on a line 286, to the input of the adder circuit 288. As mentioned, the discriminator 272 supplies the mean value to another input of the adder 288 via line 273. The adder 288 adds the mean value to the residual codevector to supply, on line 290, a reproduced codevector which is a substantial representation of the corresponding input vector processed by the encoder 100 of FIG. 7 (in situations where a mean only was transmitted, the codebook processor provides a NULL vector to the adder 288). Each reproduced codevector on line 290 is supplied to a D/A converter, 294, as shown. As is understood, the decoder 258 receives many Huffman codes, each representative of a different input vector encoded at the transmitting location by the encoder 100. Thus, the decoder 258 repeats the process described above for each received Huffman code and provides the reproduced input vectors, which are in digital form, to D/A converter 294 for conversion back to analog form. The analog data is NTSC encoded by encoder 296 and supplied to the input of a TV or VCR as hereinbefore described.

Figure 12:
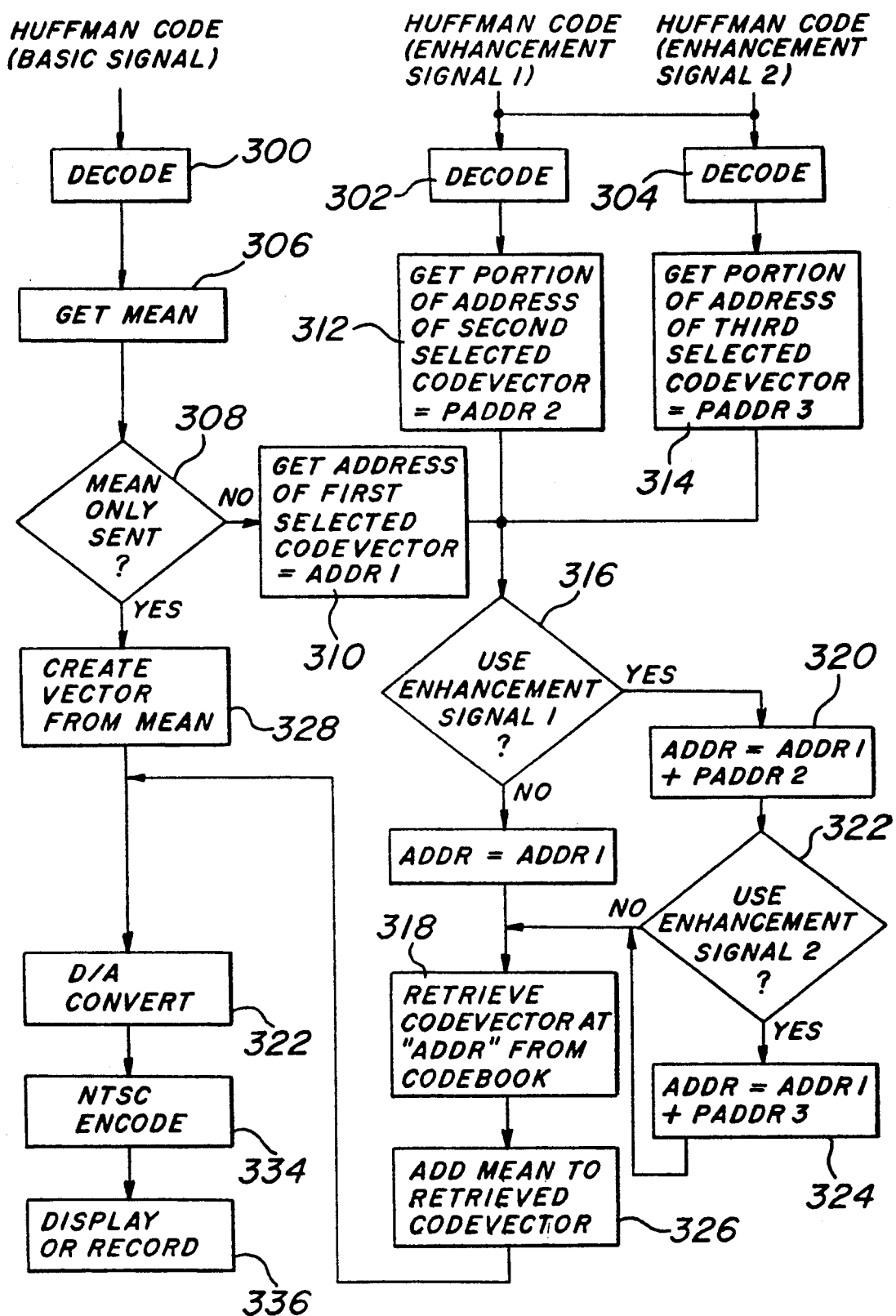
FIG. 12 is a flowchart illustrating the operation of the apparatus of FIG. 11.

FIG. 12 is a flowchart illustrating the operation of the circuit of FIG. 11. As shown, the Huffman codes of the basic and enhancement signals are received and decoded by decode circuits 260, 262 and 264 respectively, as shown at steps 300, 302 and 304. The mean value is retrieved from the basic signal at step 306. Then, at step 308, a determination is made as to whether a codebook address of a first selected codevector was transmitted along with the mean. As previously mentioned, when the mean only is transmitted, the encoder 100 must transmit data indicating that only the mean was transmitted. This may be done by appending a code to the mean value at the encoder. If, at step 308, it was determined that a codebook address did not accompany the mean value, then, as shown at step 328, a vector is reproduced solely from the mean value, and the reproduced vector is supplied to the D/A converter 294, as shown at 332. The process repeats for all incoming Huffman data.

If, however, at step 308, it was determined that a codebook address did accompany the transmission of the mean value, then that codebook address is retrieved and stored in ADDR1, as shown at step 310. In such cases, the first enhancement signal will contain a portion of the address of a second selected codevector, and the second enhancement signal will contain a portion of the address of a third selected codevector. Accordingly, these portions are retrieved at steps 312 and 314 and stored in PADDR2 and PADDR3 respectively. Then, as shown at step 316, a determination is made as to whether the decoder is to employ the first enhancement signal. If, at step 316, it is determined that the first enhancement signal is not to be employed, then the address used for codebook retrieval (ADDR) is set to the address of the first selected codevector (i.e., ADDR=ADDR1). The codevector residing at ADDR (i.e., the address of the first selected codevector) is then retrieved from the codebook.

If, however, at step 316, it is determined that the first enhancement signal is to be employed, then the portion of the address of the second selected codevector (PADDR2) is appended to the address of the first selected codevector and the appended address is stored in ADDR (i.e., ADDR=ADDR1 & PADDR2), as shown at step 320. Thus, ADDR now contains the complete address of the second selected codevector. Then, at step 322, a determination is made as to whether the decoder is to employ the second enhancement signal. If, at step 322, it is determined that the second enhancement signal is not to be employed, then the codevector residing at ADDR (i.e., the address of the second selected codevector) is retrieved from the codebook. If, however, at step 322, it is determined that the second enhancement signal is to be employed, then the portion of the address of the third selected codevector (PADDR3) is appended to the current contents of ADDR (i.e., the address of the second selected codevector) and the appended address is restored in ADDR (i.e., ADDR=ADDR & PADDR3), as shown at step 324. Thus, ADDR now contains the complete address of the third selected codevector. Control then passes to step 318 where the address residing at ADDR (i.e., the address of the third selected codevector) is retrieved from the codebook.

Thus, either the first, second or third selected codevector will be retrieved from the decoder codebook. As mentioned, the first, second and third codevectors are selected from successively lower levels of the codebook, and codevectors at lower levels of the codebook generally represent possible input vectors with greater accuracy than codevectors at preceding levels. Accordingly, the second selected codevector will generally be a more accurate representation of the corresponding input vector than the first selected codevector. Similarly, the third selected codevector will be a more accurate representation of the input vector than either the first or second selected codevectors. Thus, by employing the enhancement signals, more accurate representations of the input vector may be recovered at the decoder. The decision to employ enhancement signals is made at the decoder by the user, as needed. Thus, the user can choose to employ the enhancement signals at certain times and to not employ them at other times. Additionally, the user may employ only one of the enhancement signals if desired.

As mentioned, the codevector retrieved at step 318 is actually a residual codevector (i.e. a representation of the input vector with its mean removed). Therefore, at step 326, the input vector is reproduced by adding the mean value back to the residual codevector. It is understood by those skilled in the art that the operation of the decoder will be repeated for each input vector encoded and transmitted by the encoder. Each reproduced codevector is D/A converted (step 332), NTSC encoded (step 334), and then displayed (step 336), e.g., on a TV or stored e.g., on a VCR.

In FIGS. 11 and 12, the reproduced image vector is shown as being supplied directly to the D/A converter 294. However, this illustration is simplified and is for purposes of expediency only. Those skilled in the art will readily appreciate that a full scan line will need to be obtained, i.e., from several sequential image vectors, for the NTSC encoder to trace a line of the image on the display or recording device. This may be performed by employing a small buffer to store those sequential image vectors needed to construct a scan line. An alternative method of retrieving a scan line is disclosed in co-pending patent application no. 794,487, entitled "Method and Apparatus for Low Frequency Removal in Vector Quantization."

Figure 13:
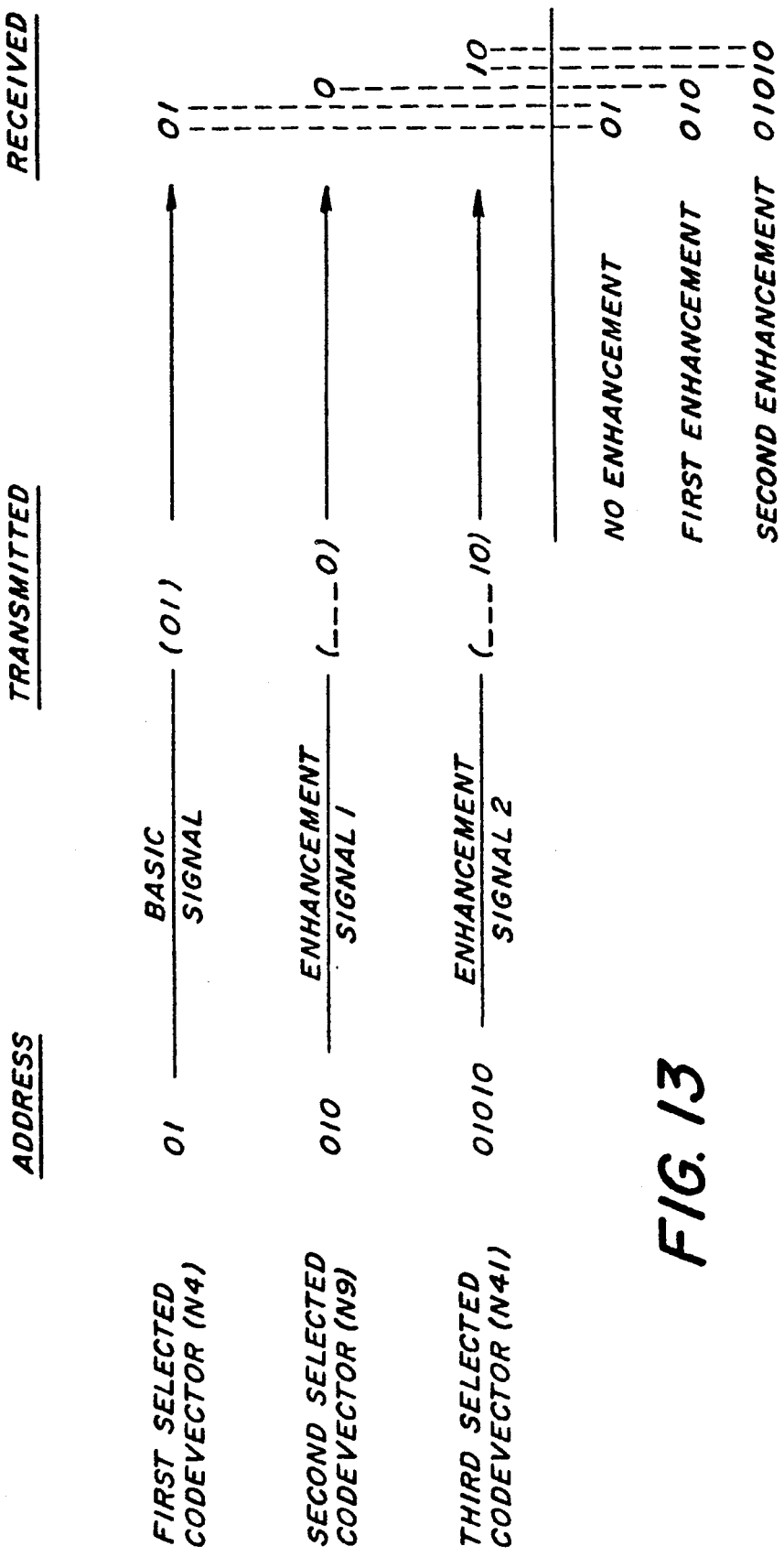
FIG. 13 graphically illustrates the transmission of a basic VQ signal and two enhancement signals in accordance with the method of the present invention.

Referring now to FIG. 13, an exemplary transmission and reception is illustrated in accordance with the present invention. For purposes of illustration, suppose that the encoder 100 and decoder 258 each employ the exemplary tree search codebook of FIG. 5. Suppose also that vector quantization of an input vector at the encoder results in the codevector at node N4 (address=[01]) being selected as the first selected codevector for the input vector. Suppose further that the codevector at node N9 (address=[010]) of the tree is selected as the second selected codevector, and the codevector at node N41 (address=[01010]) is selected as the third selected codevector. As shown in FIG. 13, the basic signal comprises the full address of the first selected codevector [01]. The first enhancement signal comprises the portion [0] of the address of the second selected codevector that in combination with the address of the first selected codevector uniquely identifies the second selected codevector (i.e., forms the full address of the second selected codevector—[01] & [0]=[010]). Similarly, the second enhancement signal comprises the portion [10] of the address of the third selected codevector that in combination with the address of the first selected codevector (basic signal) and the portion of the address of the second selected codevector (enhancement signal 1) uniquely identifies the third selected codevector (i.e., forms the full address of the third selected codevector [01] & [0] & [10] =[01010]).

As shown in FIG. 13, at the receiver, the address of the first selected codevector [01] can be retrieved from the basic signal and employed alone with no enhancement. Alternatively, the portion of the address of the second selected codevector [0] can be retrieved from the first enhancement signal and appended to the address of the first selected codevector to form the address of the second selected codevector (i.e., [01] & [0] = [010]). Additionally, the portion of the address of the third selected codevector may be appended as well to form the address of the third selected codevector (i.e., [01] & [0] & [10] = [01010]). Appending these portions will increase the accuracy of the reproduction, because the second and third selected codevectors represent the input vector with greater accuracy than the first selected codevector.

The invention has been described above as being carried out in the spatial domain, i.e., the codevectors stored in the codebook are representative of the spatial placement of the pixels in each sub-image, and the input vectors used to search the codebook are representative of the spatial placement of an actual group of pixels. However, the invention is not limited to implementation in the spatial domain. The invention may also be carried out in the transform, or frequency, domain wherein, instead of storing spatial codevectors as above described, their transforms are calculated and transformed codevectors are stored in the codebook. For example, each codevector would be replaced by its cosine (Fourier) transform, and each input vector would be transformed prior to searching the codebook. In this case, the codebook would still be constructed as described in the above mentioned Linde et al. reference, but entries Would be based upon a distance metric (e.g., mean square error) in the transformed vector space. Thus, in the encoder, the tree search would be carried out in the transform domain. However, the decoder would remain unchanged. The decoder codebook would continue to operate in the spatial domain. The advantage of this approach is that it is believed that it would result in fewer "block" artifacts commonly found in VQ encoder/decoder schemes.

The present invention may be employed in other specific forms without departing from the spirit or essential attributes thereof and, accordingly, reference should be made to the appended claims rather than to the foregoing specification, as indicating the scope of the invention.

We claim:

1. In a tree search, variable rate vector quantization data compression system of the type the organizes an image frame into blocks of input data, and converts each block of input data to a multi-dimensional input vector, and having a codebook with plural levels of codevectors, each codevector being representative of a possible input vector, the codevectors at each successive level representing possible input vectors with greater accuracy than codevectors at a preceding level, each codevector having an associated address, a method comprising the steps of:
   a) for each input vector, automatically selecting a plurality of codevectors, each codevector being selected from a different level of the codebook;
   b) for a first one of the selected codevectors, transmitting data indicative of the address associated therewith; and,
   c) for each of the other selected codevectors, transmitting data indicative of at least a portion of the address of each other selected codevectors that, in combination with previously transmitted address data, uniquely identifies each other selected codevector.

2. Method according to claim 1 wherein a compression code is assigned to each possible address and each possible portion of an address, each compression code having a length that is substantially inversely proportional to a predetermined probability that a particular codevector will be selected in step (a), and step (b) comprises transmitting the compression code for the address associated with the first one of the selected codevectors, and step (c) comprises transmitting the compression code for each said portion.

3. Method according to claim 1 wherein the address data to be transmitted has variable length and is temporarily stored then transmitted at a substantially fixed rate.

4. Method according to claim 1 further comprising the steps of:
   a') providing another substantially identical tree search vector quantization codebook at a remote receiving location;
   b') receiving at the receiving location the data transmitted for each input vector and obtaining therefrom the address for the first selected codevector and the address portions for other selected codevectors;
   c') combining the address of the first selected codevector and at least one of the address portions to uniquely identify one of the other selected codevectors;
   d') retrieving from the codebook at the receiving location the codevector uniquely identified in step (c'); and
   e') employing the retrieved codevector to provide at the receiving location a substantial representation of the block of input data.

5. Method according to claim 1 wherein there are a plurality of first and second threshold values and step (a) comprises:
   (i) selecting an initial level of the codebook and a first one of each of first and second threshold values;
   (ii) initially selecting the codevector at the selected level that most closely resembles a representation of the input vector;
   (iii) obtaining a measure of difference between the initially selected codevector in step (ii) and the selected one of the first threshold values;
   (iv) defining the initially selected codevector in step (ii) as a finally selected codevector if either (i) the measure of difference is not greater than the selected one of the first threshold values or (ii) the selected level is not less than the selected one of the second threshold values, then transmitting data indicative of the address of the finally selected codevector and proceeding to step (vi), but otherwise proceeding to step (v);
   (v) selecting subsequent levels in the codebook and repeating steps (ii)–(iv) for each subsequent level until address data has been transmitted;
   (vi) selecting next subsequent codebook levels and subsequent ones of each of the first and second threshold values;
   (vii) repeating steps (ii)–(vi) so as to transmit address data for finally selected codevectors from plural levels of the codebook.

6. Method according to claim 5 wherein a mean value of the input vector is determined and the mean value is removed from the input vector to obtain a residual vector, and the representation of the input vector is the residual vector.

7. Method according to claim 1 wherein the plurality of codevectors are selected according to a plurality of different threshold values.

8. Method according to claim 7 wherein there are a plurality of first and second threshold values and wherein each first threshold value is indicative of a tolerable distortion between a representation of the input vector and a codebook vector, and each second threshold value is indicative of a level of the codebook from which a codevector should be selected if the distortion is less than the first threshold value.

9. Method according to claim 7 wherein the addresses have a variable length that increases with each level of codevectors, further comprising the step of periodically adjusting the threshold values based upon an average length of data transmitted in steps (b) and (c).

10. Method according to claim 7 wherein there are a plurality of buffers for temporarily storing the address data to be transmitted, further comprising the step of storing the address data for the first one of the selected codevectors in a first one of the buffers and storing the said at least portions of address data for each of the other selected codevectors in other associated ones of the buffers, each buffer corresponding to one of the threshold values, each threshold value being individually adjusted based upon a measure of unused capacity of its corresponding buffer.

11. In a tree search, variable rate vector quantization data compression system of the type that organizes an image frame into blocks of input data, and converts each block of input data to a multi-dimensional input vector, and having a codebook with plural levels of codevectors, each codevector being representative of a possible input vector, the codevectors at each successive level representing possible input vectors with greater accuracy than codevectors at a preceding level, each codevector having an associated address, the addresses increasing in length with each subsequent level of the codebook, a method comprising the steps of:
 a) defining first and second threshold values wherein the first threshold value is indicative of a tolerable distortion between a representation of the input vector and a codebook vector and the second threshold value is indicative of a level of the codebook from which a codevector should be selected if the distortion is greater than the first threshold value;
 b) providing first and second buffers, there being a buffer corresponding to each threshold value;
 c) for each input vector, automatically selecting, based upon the threshold values, a plurality of codevectors, each codevector being selected from a different level of the codebook, each buffer being assigned to one of the selected codevectors;
 d) for a first codevector selected for each input vector, storing data indicative of the address associated therewith in the buffer assigned to the first selected codevector;
 e) for each subsequent codevector selected for each input vector, storing, in its assigned buffer, data indicative of at least a portion of the address associated therewith that, in combination with address data stored in other buffers, uniquely identifies the subsequent codevectors; and,
 f) transmitting the address data from the buffers while periodically adjusting the threshold values based upon a measure of unused capacity of their corresponding buffer.

12. Method according to claim 11 further comprising the steps of:
 a') providing another substantially identical tree search vector quantization codebook at a remote receiving location;
 b') receiving at the receiving location the data transmitted for each input vector and obtaining therefrom the address for the first selected codevector and the address portions for the subsequently selected codevectors;
 c') combining the address of the first selected codevector and at least one of the address portions to uniquely identify one of the subsequently selected codevectors;
 d') retrieving from the codebook at the receiving location the codevector uniquely identified in step (c'); and
 e') employing the retrieved codevector to provide at the receiving location a substantial representation of the block of input data.

13. Method according to claim 11 wherein there is a pair of first threshold values and a pair of second threshold values and wherein step (c) comprises:
 (i) selecting an initial level of the codebook and one of the threshold values in each of the first and second pair of threshold values;
 (ii) initially selecting the codevector at the selected level that most closely resembles the representation of the input vector;
 (iii) obtaining a measure of difference between the initially selected codevector in step (ii) and the first threshold value in the selected pair of threshold values;
 (iv) defining the initially selected codevector in step (ii) as a finally selected codevector if either (i) the measure of difference is not greater than the first threshold value in the selected pair of threshold values or (ii) the selected level is not less than the second threshold value in the selected pair of threshold values, then transmitting data indicative of the address of the finally selected codevector and proceeding to step (vi), but otherwise proceeding to step (v);
 (v) selecting subsequent levels in the codebook and repeating steps (ii)–(iv) for each subsequent level until address data has been transmitted;
 (vi) selecting next subsequent codebook levels and subsequent pairs of the threshold values;
 (vii) repeating steps (ii)–(vi) so as to transmit address data for finally selected codevectors from plural levels of the codebook.

14. Method according to claim 13 wherein a compression code is assigned to each possible address and each possible portion of an address, each compression code having a length that is substantially inversely proportional to a predetermined probability that a particular codevector will be selected in step (c), and step (d) comprises storing the compression code for the address associated with the first one of the selected codevectors, and step (e) comprises storing the compression code for each said portion.

15. In a tree search, variable rate vector quantization data compression system of the type that converts a block of input data to a multi-dimensional input vector, and having a codebook with plural levels of codevectors, each codevector being representative of a possible input vector, the codevectors at each successive level representing possible input vectors with greater accuracy than codevectors at a preceding level, each codevector having an associated address, each address having a length that increases with each subsequent level of the codebook, a method comprising the steps of:

a) defining a plurality of distortion threshold values and an equal plurality of codebook level threshold values, there being a codebook level threshold value corresponding to each distortion threshold value;

b) selecting a first one of the distortion threshold values and the corresponding one of the codebook level threshold values, and defining the same as current distortion threshold and current codebook level threshold values, respectively;

c) receiving and processing an input vector, selecting an initial level of the codebook, and defining the initial level as a current level;

d) comparing the processed input vector to the codevectors at the current level of the codebook and selecting the codevector at the current level that most closely resembles the processed input vector;

e) obtaining a measure of distortion between the processed input vector and the selected codevector;

f) storing an indication of the address associated with the selected codevector only if the measure of distortion is less than the current distortion threshold value, but otherwise selecting a next level of the codebook;

g) redefining the current level as the next level selected in step (f);

h) repeating steps (d)-(g) until either the measure of distortion is less than the current distortion threshold value or a level of the codebook subsequent to the current level is not less than the current codebook level threshold value, then storing the indication;

i) selecting a next one of the distortion threshold values and the corresponding one of the codebook level threshold values and redefining the current distortion threshold and codebook level threshold values as the selected distortion threshold and codebook level threshold values, respectively;

j) selecting a next level of the codebook and redefining the current level as the next level selected in this step (j);

k) comparing the processed input vector to the codevectors at the current level of the codebook and selecting the codevector at the current level that most closely resembles the processed input vector;

l) obtaining a measure of distortion between the processed input vector and the selected codevector;

m) proceeding to step (n) if either the measure of distortion is less than the current distortion threshold value or a level of the codebook subsequent to the current level is not less than the current codebook level threshold, but otherwise repeating steps (j) through (l);

n) storing an indication of only a portion of the address of the codevector selected at the current level that, in combination with previously stored data, is required to uniquely identify the codevector selected at the current level; and o) transmitting the stored data while periodically adjusting the distortion threshold and codebook level threshold values based upon the amount of stored data.

16. Method according to claim 15 wherein a compression code is assigned to each possible address and each possible portion of an address, each compression code having a length that is substantially inversely proportional to a predetermined probability that a particular codevector will be finally selected in either step (d) or (k), and wherein step (f) comprises storing the compression code for the address associated with the codevector finally selected in step (d), and step (n) comprises storing the compression code for the portion of the address associated with the codevector selected in step (k).

17. Method according to claim 15 wherein the stored address data has variable length and is transmitted at a substantially fixed data rate and adjustment of the threshold values ensures that there is no overflow or empty storage condition as a result of storing address data at a variable rate while transmitting the same at a substantially fixed rate.

18. Method according to claim 15 wherein, prior to performing step (d), a mean value of the input vector is determined and the mean value is removed from the input vector to obtain a residual vector, and the residual vector is employed to select the codevectors in steps (d) and (i), the residual vector being said processed version of the input vector.

19. Method according to claim 15 wherein the compression codes are Huffman codes.

20. Method according to claim 15 wherein the system receives input data to be compressed and the input data comprises image frames representing moving images to be displayed on a television set, each image frame comprising a matrix of pixels and each pixel within each image frame having at least an associated intensity value, and at least one of the input vectors are representative of the intensity values of a block of pixels in the image.

21. Method according to claim 20 further comprising the steps of:

a') providing another substantially identical tree search vector quantization codebook at a locale of the television set;

b') receiving the transmitted indications and obtaining therefrom the address of the first selected codevector and the portions of addresses of the other selected codevectors;

c') combining the address of the first selected codevectors and at least one of the portions to uniquely identify one of the other selected codevectors;

d') retrieving from the codebook at the locale of the television set the codevector uniquely identified in step (c'); and e') employing the retrieved codevector to substantially recreate the image data for display on the television set.

22. Method comprising the steps of:

a) providing, at an earth station, a tree search variable rate vector quantization data compression system of the type that organizes an image frame into blocks of input data and that converts each block of input data to a multi-dimensional input vector, and having a codebook with plural levels of codevectors, each codevector being representative of a possible input vector, the codevectors at each successive level representing possible input vectors with greater accuracy than codevectors at a preceding level, each codevector having an associated address, the addresses increasing in length with each subsequent level of the codebook;

b) defining, in the compression system, a plurality of pairs of first and second threshold values wherein each first threshold value is indicative of a tolerable distortion between a representation of the input vector and a codebook vector and each second threshold value is indicative of a level of the codebook from which a codevector should be selected if the distortion is greater than the first threshold value;

c) providing, in the compression system, a plurality of buffers, there being a buffer corresponding to each pair of threshold values;

d) in the compression system:
 (i) for each input vector, automatically selecting, based upon the threshold values, a plurality of codevectors, each codevector being selected from a different level of the codebook, each buffer being assigned to one of the selected codevectors;
 (ii) for a first codevectors selected for each input vector, storing data indicative of the address associated therewith in the buffer assigned to the first selected codevector;
 (iii) for each subsequent codevector selected for each input vector, storing, in its assigned buffer, data indicative of at least a portion of the address associated therewith that, in combination with address data stored in other buffers, uniquely identifies the subsequent codevector;

e) transmitting from the earth station, via satellite, to a receiving location, the address data from the buffers while periodically adjusting each pair of threshold values based upon a measure of unused capacity of its corresponding buffer;

f) at the receiving location;
 i) providing another tree search vector quantization codebook that is substantially identical to that in the compression system;
 (ii) receiving the data transmitted for each input vector and obtaining therefrom the address for the first selected codevector and the address portions for the subsequently selected codevectors;
 (iii) combining the address of the first selected codevector and at least one of the address portions to uniquely identify one of the subsequently selected codevectors;
 (iv) retrieving from the codebook at the receiving location the codevector uniquely identified in step (F)(iii); and
 (v) employing the retrieved codevector to provide at the receiving location a substantial representation of the block of input data.

23. Method according to claim 22 wherein the receiving location comprises a DBS subscriber.

24. Method according to claim 22 wherein the receiving location comprises a cable head end and a plurality of subscribers.

25. Method according to claim 24 wherein steps (f)(i) through (f)(v) are performed at the cable head end and NTSC encoded picture data is transmitted from the cable head end to the subscribers.

26. Method according to claim 24 wherein the cable head end receives the transmitted address data and retransmits the same to the subscribers, and steps (f)(i) through (f)(v) are performed at a locale of each subscriber.

27. Data compression apparatus comprising:
first means for receiving a multi-dimensional input vector representative of a block of data to be compressed;
a tree search vector quantization codebook having plural levels of codevectors, each codevector being representative of a possible input vector and the codevectors at each successive level representing possible input vectors in greater detail than codevectors at a preceding level, each codevector having a unique address associated therewith;
a controller coupled to the first means and to the tree search codebook for maintaining a plurality of threshold values and for repeatedly and automatically comparing the input vector to the codevectors at successive levels of the codebook and for repeatedly and automatically selecting a plurality of codevectors for the input vector, each codevector being selected from a different level based on a comparison of one of the threshold values with a measure of difference between the codevector and the input vector; and,
a plurality of transmitters each coupled to the controller, a first one of the transmitters for transmitting an indication of the address associated with a firs tone of the selected codevectors, the indication of the address associated with the first one of the selected codevectors being representative of a basic signal, each other transmitter for transmitting an indication of at least a portion of the address associated with a one of the remaining selected codevectors, each indication of at least a portion of the address associated with a one of the remaining selected codevectors being representative of an enhancement signal.

28. Apparatus according to claim 27 further comprising a plurality of lossless compression encoders, a first one of the encoders being coupled to the first one of the transmitters for assigning a compression code to the address of the first one of the selected codevectors, each other encoder being coupled to a respective one of the other transmitters for assigning a compression code to the portion of the address of the one of the remaining selected codevectors, the compression codes having a length that is substantially inversely proportional to a probability that the selected codevector would be selected, the transmitters each transmitting an indication of the respective compression code.

29. Apparatus according to claim 27 wherein the data compression apparatus is embodied as a portion of a pay television encoder.

30. Apparatus according to claim 27 wherein the indication of the address of the first one of the selected codevectors is representative of a basic compression signal and wherein the indication of each of the portions of the addresses of the remaining selected codevectors is representative of an enhancement signal.

31. Apparatus according to claim 27 further comprising calculator means for determining a mean value of the input vector and for removing the mean value from the input vector to obtain a residual vector, the controller employing the residual vector to select the codevectors.

32. Apparatus according to claim 31 wherein the first one of the transmitters further transmits an indication of the mean value.

33. Apparatus according to claim 27 further comprising a plurality of data buffers, each data buffer being coupled to a respective one of the transmitters for temporarily storing indications to be transmitted by the transmitter.

34. Apparatus according to claim 33 wherein at least one of the threshold values is periodically adjusted based upon a measure of unused capacity of at least one of the data buffers.

35. Apparatus according to claim 33 further comprising a plurality of feedback loops respectively coupling each of the data buffers to the controller for supplying the threshold values.

36. Apparatus according to claim 33 wherein the addresses of the selected codevectors have variable length and wherein the data buffers each comprise a first-in first-out (FIFO) buffer and further wherein the indications of the selected addresses and portions of addresses are transmitted form the FIFOs at a fixed data rate.

37. A decoder for use by subscribers of a pay television system employing, at a head end thereof, a tree search vector quantization data compressor for compressing digital data indicative of at least intensity values of pixels of images to be transmitted to the subscribers, and having a first codebook having plural levels of codevectors representative of possible input vectors and each successive level representing codevectors with a greater accuracy than a preceding level of codevectors, the head end transmitting a basic signal comprising data indicative of the address of a first selected codevector found to most closely resemble the input vector and successively transmitting a plurality of enhancement signals each indicative of a portion of an address of a subsequently selected codevector, each portion of an address being such that, in combination with previously transmitted data, the portion uniquely identifies the selected codevector, the decoder comprising:

a second codebook being substantially identical in content to the first codebook;

first means for receiving the basic signal and each successive enhancement signal, and for combining the basic signal and a selected number of the enhancement signals to obtain an address for addressing the second codebook and retrieving a codevector therefrom residing at the obtained address, the retrieved codevector being a function of the number of enhancement signals combined with the basic signal;

second means for converting the retrieved codevectors to NTSC image data and for providing the NTSC image data at an output thereof for substantially reproducing images input to the head end.

* * * * *